US 6,455,665 B1

(12) United States Patent
Barnette et al.

(10) Patent No.: US 6,455,665 B1
(45) Date of Patent: Sep. 24, 2002

(54) POLYMERS AND POLYMERIZATION PROCESSES

(75) Inventors: Deborah Barnette, Ellicott City, MD (US); James English, Chelsea, AL (US); Keith Branham, Pelham, AL (US); Donna Hall, Verbena, AL (US); Reuben Land, Huntingtown, MD (US); Doug Mink, Baltimore, MD (US); Zhong Zhao, Ellicott City, MD (US)

(73) Assignee: Guilford Pharmaceuticals Inc., Baltimore, MD (US)

( * ) Notice: Subject to any disclaimer, the term of this patent is extended or adjusted under 35 U.S.C. 154(b) by 0 days.

(21) Appl. No.: 09/885,085

(22) Filed: Jun. 21, 2001

Related U.S. Application Data

(60) Provisional application No. 60/228,729, filed on Aug. 29, 2000, and provisional application No. 60/216,462, filed on Jul. 6, 2000.

(51) Int. Cl.[7] ............................................. C08G 63/02

(52) U.S. Cl. ........................................ 528/272; 528/271

(58) Field of Search .................................. 528/271, 272

(56) References Cited

U.S. PATENT DOCUMENTS

| 5,194,581 | A | 5/1993 | Leong | 528/398 |
|---|---|---|---|---|
| 5,256,765 | A | 10/1993 | Leong | 528/398 |
| 5,717,047 | A | 2/1998 | Russell et al. | 526/278 |
| 5,952,451 | A | 9/1999 | Zhao | 528/272 |
| 6,008,318 | A | 12/1999 | Zhao et al. | 528/398 |
| 6,166,173 | A | 12/2000 | Mao et al. | 528/398 |
| 6,322,797 | B1 | 11/2001 | Mao et al. | 424/271 |

FOREIGN PATENT DOCUMENTS

| WO | WO98/44020 | 10/1998 |
|---|---|---|
| WO | WO98/44021 | 10/1998 |
| WO | WO98/48859 | 11/1998 |

*Primary Examiner*—Terressa M. Boykin
(74) *Attorney, Agent, or Firm*—Heller Ehrman White & McAuliffe

(57) ABSTRACT

The present invention provides improved processes for purifying polymer preparations by removing contaminants, such as metal contaminants. The present invention also provides improved processes for producing phosphopolymers, which can yield improved polymers in terms of molecular weight, homogeneity, consistency and purity. Polymers and polymer preparations also are provided. The present invention is time, labor and energy efficient, and thus marks an improvement over past approaches.

74 Claims, No Drawings

POLYMERS AND POLYMERIZATION PROCESSES

This application claims priority to U.S. Ser. No. 60/228,729, filed Aug. 29, 2000, and U.S. Ser. No. 60/216,462, filed Jul. 6, 2000.

The present invention relates to improved polymers and polymerization processes, and are particularly suitable for producing polymers for a variety of uses, including pharmaceuticals, medical devices, food packaging materials and the like. The improved polymers have reduced levels of contaminants as compared to the commercial polymers currently available, as demonstrated below, and thus are ideal for situations where the polymer, or compositions in contact with the polymer, are injected or inserted into, placed within or on, and/or ingested by a living organism. The ability to reduce contaminant levels according to the invention permits greater flexibility in terms of polymerization reaction conditions, including types and amount of catalysts and reactants, as well as expanding the fields of use for polymers and polymer preparations. See U.S. Ser. No. 60/228,729, the entirety of which is hereby incorporated by reference.

The present invention also relates to various polymers, which include the phosphopolymers, which are polymers containing phosphorous linkages. Phosphopolymers include the polyphosphoester polymers ("polyphosphoesters"). These polymers are considered to be biodegradeable polymers having phosphorous-based linkages.

Polyphosphoesters contain phosphate ester bonds, phosphonate ester bonds and/or phosphite ester bonds. Certain polyphosphoesters have hydrolyzable bonds, and as such are considered useful in in vivo contexts because they are biodegradable/biocompatible—at least in part by virtue of the labile phosphoester bond in the polymer backbone. New and useful biodegradable phosphopolymers have previously been produced. See U.S. Pat. Nos. 5,952,451 and 6,008,318; and PCT publications WO 98/44020, WO 98/44021, and WO 98/48859, which are hereby incorporated by reference in their entirety.

Polyphosphoesters have been produced using bulk melt polymerization processes, such as polymerizations using L-lactide, ethylene glycol and ethyl phosphorodichloridate:

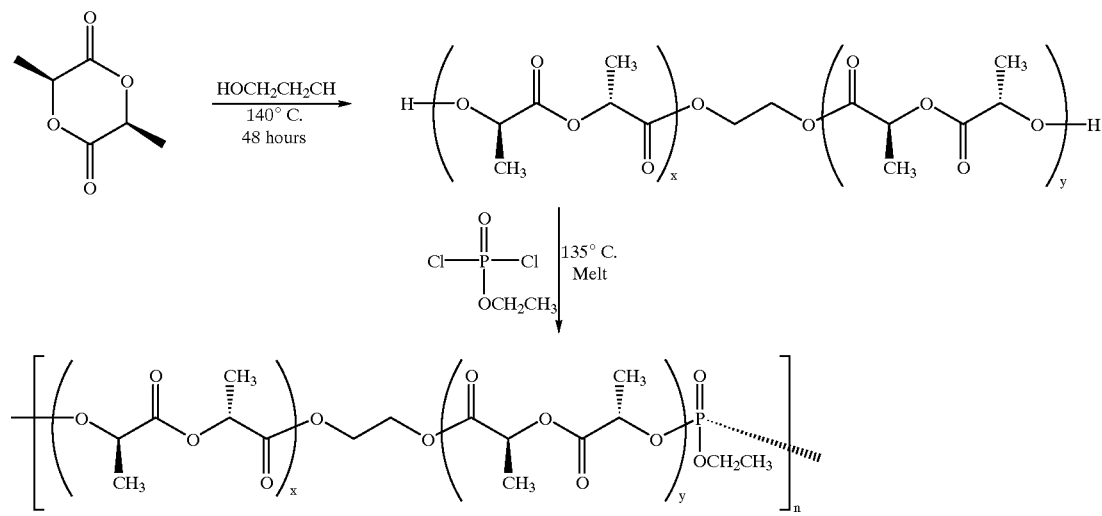

This example is Poly(L-lactide-co-ethyl phosphate), referred to as Poly(LA-EG-EOP).

Similar approaches have been used to form Poly(L-lactide-co-hexyl phosphate), referred to as Poly(LAEG-HOP), except that hexyl phosphodichloridate (HOP) substitutes for ethyl phosphorodichloridate (EOP). The polymer is depicted below:

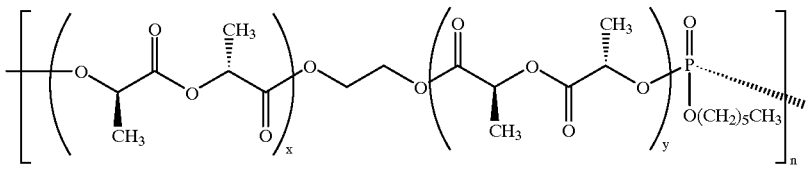

Many previous production methodologies have been comparatively energy and time consuming in terms of overall yield. Accordingly, there is a desire to improve production methodologies to provide greater efficiency and control over the polymerization process. The invention disclosed herein provides improved production methodologies, which result in more efficient production, enhanced purity, better polymer properties, increased yields and improved control over molecular weight and other properties.

For convenience, before further description of the present invention, certain terms employed in the specification, examples, and appended claims are collected and explained here. These definitions should be read in light of the remainder of the disclosure and understood as by a person of skill in the art.

The terms "biocompatible polymer" and "biocompatibility," in their various grammatical forms, when used in relation to polymers are art-recognized. For example, biocompatible polymers include polymers that are neither themselves toxic to the host (e.g., an animal or human), nor degrade (if the polymer degrades) at a rate that produces monomeric or oligomeric subunits or other byproducts at toxic concentrations in the host. In certain embodiments of the present invention, biodegradation generally involves degradation of the polymer in an organism, e.g., into its monomeric subunits, which may be known to be effectively non-toxic. Intermediate oligomeric products resulting from such degradation may have different toxicological properties in some instances, however, or biodegradation may involve oxidation or other biochemical reactions that generate molecules other than monomeric subunits of the polymer. Consequently, it may be desired in some circumstances to evaluate the toxicology of a biodegradable polymer intended for in vivo use, such as implantation or injection into a patient, which may be readily determined after one or more toxicity analyses. It is not necessary that any subject composition have a purity of 100% to be deemed biocompatible; indeed, it is only necessary that the subject compositions be biocompatible as set forth above. Hence, a subject composition may comprise a polymer comprising 99%, 98%, 97%, 96%, 95%, 90%, 85%, 80%, 75% or even less of biocompatible polymers, e.g., including polymers and other materials and excipients described herein, and still be biocompatible.

As mentioned above, to determine whether a polymer or other material is biocompatible, it may be desirable to conduct a toxicity analysis. Such assays are well known in the art, and are performed routinely. One example of such an assay may be performed with live carcinoma cells, such as GT3TKB tumor cells, in the following manner: the sample is degraded in 1M NaOH at 37° C. until complete degradation is observed. The solution is then neutralized with 1M HCl. About 200 $\mu$L of various concentrations of the degraded sample products are placed in 96-well tissue culture plates and seeded with human gastric carcinoma cells (GT3TKB) at $10^4$/well density. The degraded sample products are incubated with the GT3TKB cells for 48 hours. The results of the assay may be plotted as % relative growth vs. concentration of degraded sample in the tissue-culture well. In addition, polymers and formulations of the present invention may also be evaluated by well-known in vivo tests, such as subcutaneous implantations in rats to confirm that they hydrolyze without significant levels of irritation or inflammation at the subcutaneous implantation sites.

In certain embodiments, polymeric formulations of the present invention biodegrade within a period that is acceptable in the desired application. In certain embodiments, such as in vivo therapy, such degradation occurs in a period usually less than about five years, one year, six months, three months, one month, fifteen days, five days, three days, or even one day on exposure to a physiological solution with a pH between 6 and 8 having a temperature of between 25 and 37° C. In other embodiments, the polymer degrades in a period of between about one hour and several weeks, depending on the desired application.

The term "biodegradable," in its various grammatical forms, is art-recognized, and includes polymers, compositions and formulations, such as those described herein, that are intended to degrade during use. Biodegradable polymers typically differ from non-biodegradable polymers in that the former may be degraded during use. In certain embodiments, such use involves in vivo use, such as in vivo therapy, and in other certain embodiments, such use involves in vitro use. In general, degradation attributable to biodegradability involves the degradation of a biodegradable polymer into its component subunits, or digestion, e.g., by a biochemical process, of the polymer into smaller, non-polymeric subunits. In certain embodiments, two different types of biodegradation may generally be identified. For example, one type of biodegradation may involve cleavage of bonds (whether covalent or otherwise) in the polymer backbone. In such biodegradation, monomers and oligomers typically result, and even more typically, such biodegradation occurs by cleavage of a bond connecting one or more of subunits of a polymer. In contrast, another type of biodegradation may involve cleavage of a bond (whether covalent or otherwise) internal to side chain or that connects a side chain to the polymer backbone. For example, a therapeutic agent or other chemical moiety attached as a side chain to the polymer backbone may be released by biodegradation. In certain embodiments, one or the other or both generally types of biodegradation may occur during use of a polymer. As used herein, the term "biodegradation" encompasses both general types of biodegradation.

The degradation rate of a biodegradable polymer often depends in part on a variety of factors, including the chemical identity of the linkage responsible for any degradation, the molecular weight, crystallinity, biostability, and degree of cross-linking of such polymer, the physical characteristics of the implant, shape and size, and the mode and location of administration. For example, the greater the molecular weight, the higher the degree of crystallinity, and/or the greater the biostability, the biodegradation of any biodegradable polymer is usually slower. The term "biodegradable" is intended to cover materials and processes also termed "bioerodible".

In certain embodiments, if the biodegradable polymer also has a therapeutic agent or other material associated with it, the biodegradation rate of such polymer may be characterized by a release rate of such materials. In such circumstances, the biodegradation rate may depend on not only the chemical identity and physical characteristics of the polymer, but also on the identity of any such material incorporated therein.

A variety of polymers may be used in the subject invention. Both non-biodegradable and biodegradable polymers may be used in the subject invention, although biodegradable polymers in certain contexts are preferred. As discussed below, the choice of polymer will depend in part on a variety of physical and chemical characteristics of such polymer and the use to which such polymer may be put.

In certain embodiments, polymers having phosphorus linkages may be used in the subject invention. Exemplary phosphorus linkages in such polymers include, without limitation, phosphonamidite, phosphoramidite, phosphorodiamidate, phosphomonoester, phosphodiester, phosphotriester, phosphonate, phosphonate ester, phosphorothioate, thiophosphate ester, phosphinate or phosphite. Any of the subject polymers may be provided as copolymers, terpolymers, etc. Certain of such polymers may be biodegradable, biocompatible or both.

The structure of certain of the foregoing polymers having phosphorus linkages may be identified as follows. The term "biodegradable polymer having phosphorous-based linkages" is used herein to refer to polymers in which the following substructure is present at least a multiplicity of times in the backbone of such polymer:

Formula I

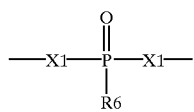

wherein, independently for each occurrence of such substructure:
X1, each independently, represents —O— or —N(R5)—;
R5 represents —H, aryl, alkenyl or alkyl; and
R6 is any non-interfering substituent,
wherein such substructure is responsible in part for biodegradability properties observed for such polymer in vitro or in vivo. In certain embodiments, R6 may represent an alkyl, aralkyl, alkoxy, alkylthio, or alkylamino group.

In certain embodiments, such a biodegradable polymer is non-naturally occurring, i.e., a man-made product with no natural source. In other embodiments, R6 is not —OH or halogen, e.g., is an alkyl, aralkyl, aryl, alkoxyl, aryloxy, or aralkyloxy. In still other embodiments, the two X1 moieties in such substructure are the same. For general guidance, when reference is made to the "polymer backbone chain" or the like of a polymer, with reference to the above structure, such polymer backbone chain comprises the motif [—X1—P—X1—]. In other polymers, the polymer backbone chain may vary as recognized by one of skill in the art.

By way of example, but not limitation, a number of representative polymers having phosphorus linkages are described in greater detail below. In certain embodiments, a polymer includes one or more monomeric units of Formula II:

Formula II

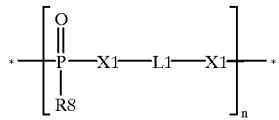

wherein, independently for each occurrence of such unit:
X1, each independently, represents —O— or —N(R7)—;
R7 represents —H, aryl, alkenyl or alkyl;
L1 is described below;
R8 represents, for example, —H, alkyl, —O-alkyl, —O-cycloalkyl, aryl, —O-aryl, heterocycle, —O-heterocycle, —Cl, —N(R9)R10 and other examples presented below;
R9 and R10, each independently, represent a hydrogen, an alkyl, an alkenyl, —(CH$_2$)n-R11, or R9 and R10, taken together with the N atom to which they are attached complete a heterocycle having from 4 to about 8 atoms in the ring structure; and
R11 represents —H, alkyl, aryl, cycloalkyl, cycloalkenyl, heterocycle or polycycle.

L1 may be any chemical moiety as long as it does not materially interfere with the polymerization or biodegradation (or both) of the polymer, wherein a "material interference" or "non-interfering substituent" is understood to mean, for synthesis of the polymer by polymerization, an inability to prepare the subject polymer by methods known in the art or taught herein, and for biodegradation, a reduction in the biodegradation of the subject polymer so as to make such polymer impracticable for biodegradation.

In certain embodiments, L1 is an organic moiety, such as a divalent branched or straight chain or cyclic aliphatic group or divalent aryl group, with in certain embodiments, from 1 to about 20 carbon atoms. In certain embodiments, L1 represents a moiety between about 2 and 20 atoms selected from carbon, oxygen, sulfur, and nitrogen, wherein at least 60% of the atoms are carbon. In certain embodiments, L1 may be an alkylene group, such as methylene, ethylene, 1,2-dimethylethylene, n-propylene, isopropylene, 2,2-dimethylpropylene, n-pentylene, n-hexylene, n-heptylene; an alkenylene group such as ethenylene, propenylene, 2-(3-propenyl)-dodecylene; and an alkynylene group such as ethynylene, proynylene, 1-(4-butynyl)-3-methyldecylene; and the like. Such unsaturated aliphatic groups may be used to cross-link certain embodiments of the present invention.

Further, L1 may be a cycloaliphatic group, such as cyclopentylene, 2-methylcyclopentylene, cyclohexylene, cyclohexylenedimethylene, cyclohexenylene and the like. L1 may also be a divalent aryl group, such as phenylene, benzylene, naphthalene, phenanthrenylene and the like. Further, L1 may be a divalent heterocyclic group, such as pyrrolylene, furanylene, thiophenylene, alkylyene-pyrrolylene-alkylene, pyridinylene, pyrimidinylene and the like.

Other examples of L1 may include any of the polymers listed above, including the biodegradable polymers listed above, and in particular polylactide, polyglycolide, polycaprolactone, polycarbonate, polyethylene terephthalate, polyanhydride and polyorthoester, and polymers of ethylene glycol, propylene glycol and the like. Embodiments containing such polymers for L1 may impart a variety of desired physical and chemical properties.

The foregoing, as with other moieties described herein, may be substituted with a non-interfering substituent, for example, a hydroxy-, halogen-, or nitrogen-substituted moiety.

R8 represents hydrogen, alkyl, cycloakyl, —O-alkyl, —O-cycloalkyl, aryl, —O-aryl, heterocycle, —O-heterocycle, or —N(R9)R10. Examples of possible alkyl R8 groups include methyl, ethyl, n-propyl, i-propyl, n-butyl, tert-butyl, —C$_8$H$_{17}$ and the like groups; and alkyl substituted with a non-interfering substituent, such as hydroxy, halogen, alkoxy or nitro; corresponding alkoxy groups.

When R8 is aryl or the corresponding aryloxy group, it typically contains from about 5 to about 14 carbon atoms, or about 5 to about 12 carbon atoms, and optionally, may contain one or more rings that are fused to each other. Examples of particularly suitable aromatic groups include phenyl, phenoxy, naphthyl, anthracenyl, phenanthrenyl and the like.

When R8 is heterocyclic or heterocycloxy, it typically contains from about 5 to about 14 ring atoms, alternatively from about 5 to about 12 ring atoms, and one or more heteroatoms. Examples of suitable heterocyclic groups include furan, thiophene, pyrrole, isopyrrole, 3-isopyrrole, pyrazole, 2-isoimidazole, 1,2,3-triazole, 1,2,4-triazole, oxazole, thiazole, isothiazole, 1,2,3-oxadiazole, 1,2,4-oxadiazole, 1,2,5-oxadiazole, 1,3,4-oxadiazole, 1,2,3,4-oxatriazole, 1,2,3,5-oxatriazole, 1,2,3-dioxazole, 1,2,4-dioxazole, 1,3,2-dioxazole, 1,3,4-dioxazole, 1,2,5-oxatriazole, 1,2-pyran, 1,4-pyran, 1,2-pyrone, 1,4-pyrone, 1,2-dioxin, 1,3-dioxin, pyridine, N-alkyl pyridinium, pyridazine, pyrimidine, pyrazine, 1,3,5-triazine, 1,2,4-triazine, 1,2,3-triazine, 1,2-oxazine, 1,3-oxazine, 1,4-oxazine, o-isoxazine, p-isoxazine, 1,2,5-oxathiazine, 1,2,6- oxathiazine, 1,4,2-oxadiazine, 1,3,5-oxadiazine, azepine, oxepin, thiepin, indene, isoindene, benzofuran, isobenzofuran, thionaphthene, isothionaphthene, indole, indolenine, 2-isobenzazole, isoindazole, indoxazine, benzoxazole, anthranil, 1,2-benzopyran, 1,2-benzopyrone, 1,4-benzopyrone, 2,1-benzopyrone, 2,3-benzopyrone, quinoline, isoquinoline, 12,-benzodiazine, 1,3-benzodiazine, naphthyridine, pyrido-[3,4-b]-pyridine, pyrido-[3,2-b]-pyridine, pyrido-[4,3-b]-pyridine, 1,3,2-benzoxazine, 1,4,2-benzoxazine, 2,3,1-benzoxazine, 3,1,4-benzoxazine, 1,2-benzisoxazine, 1,4-benzisoxazine, carbazole, xanthrene, acridine, purine, and the like. In certain embodiments, when R8 is heterocyclic or heterocycloxy, it is selected from the group consisting of furan, pyridine, N-alkylpyridine, 1,2,3- and 1,2,4-triazoles, indene, anthracene and purine rings.

In certain embodiments, R8 is an alkyl group, an alkoxy group, a phenyl group, a phenoxy group, a heterocycloxy group, or an ethoxy group.

In still other embodiments, R8, such as an alkyl, may be conjugated to a bioactive substance to form a pendant drug delivery system.

In certain embodiments, the number n in Formula II and other subject formulas ranges over a wide range, e.g., from about 5 to 25,000 or more, but generally from about 100 to 5000, or 10,000. Alternatively, in other embodiments, n may be about 10, 25, 50, 75, 100, 150, 200, 300 or 400.

In Formula II and other formulas herein, "*" represents other monomeric units of the subject polymer, which may be the same or different from the unit depicted in the formula in question, or a chain terminating group, by which the polymer terminates. Examples of such chain terminating groups include monofunctional alcohols and amines.

In another aspect, the polymeric compositions of the present invention include one or more recurring monomeric units represented in general Formula III:

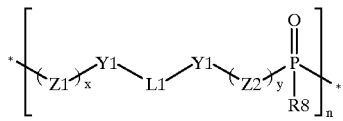

Formula III wherein Z1 and Z2, respectively, for each independent occurrence is:

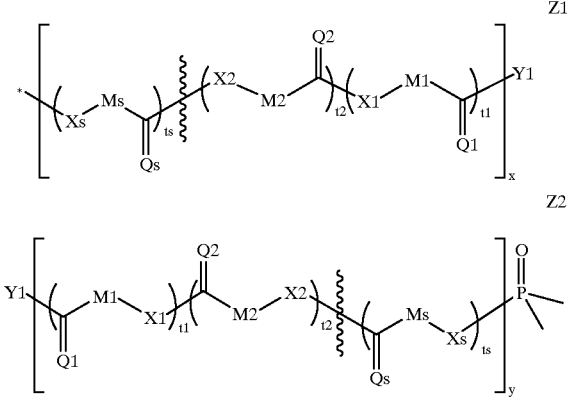

Z1

Z2 wherein, independently for each occurrence set forth above:

Q1, Q2 . . . Qs, each independently, represent O or N(R1);

X1, X2 . . . Xs, each independently, represent —O— or —N(R1);

the sum of t1, t2 . . . ts is an integer and at least one or more;

Y1 represents —O—, —S— or —N(R7)—;

x and y are each independently integers from 1 to about 1000 or more;

L1 and M1, M2 . . . Ms each independently, represent the moieties discussed below; and the other moieties are as defined above.

M1, M2 . . . Ms (collectively, M) in Formula III are each independently any chemical moiety as long as it does not materially interfere with the polymerization or biodegradation (or both) of the polymer. For certain embodiments, M in the formula are each independently: (i) a branched or straight chain aliphatic or aryl group having from 1 to about 50 carbon atoms, or (ii) a branched or straight chain, oxa-, thia-, or aza-aliphatic group having from 1 to about 50 carbon atoms. In certain embodiments, the number of such carbon atoms does not exceed 20. In other embodiments, M may be any divalent aliphatic moiety having from 1 to about 20 carbon atoms, including therein from 1 to about 7 carbon atoms, that does not cause any material interference with the polymerization or biodegradation (or both) of the subject polymer.

M may include an aromatic or heteroaromatic moiety, optionally with non-interfering substituents. In certain embodiments, none of the atoms (usually but not always C) that form the cyclic ring that gives rise to the aromatic moiety are part of the polymer backbone chain.

Specifically, when M is a branched or straight chain aliphatic group having from 1 to about 20 carbon atoms, it may be, for example, an alkylene group such as methylene, ethylene, 1-methylethylene, 1,2-dimethylethylene, n-propylene, trimethylene, isopropylene, 2,2-dimethylpropylene, n-pentylene, n-hexylene, n-heptylene, n-octylene, n-nonylene, n-decylene, n-undecylene, n-dodecylene, and the like; an alkenylene group such as n-propenylene, 2-vinylpropylene, n-butenylene, 3-thexylbutylene, n-pentenylene, 4-(3-propenyl)hexylene, n-octenylene, 1-(4-butenyl)-3-methyldecylene, 2-(3-propenyl)dodecylene, hexadecenylene and the like; an alkynylene group, such as ethynylene, propynylene, 3-(2-ethynyl)pentylene, n-hexynylene, 2-(2-propynyl)decylene, and the like; or any alkylene, alkenylene or alkynylene group, including those listed above, substituted with a materially non-interfering substituent, for example, a hydroxy, halogen or nitrogen group, such as 2-chloro-n-decylene, 1-hydroxy-3-ethenylbutylene, 2-propyl-6-nitro-10-dodecynylene, and the like. Other M of the present invention include —(CH$_2$)$_3$—, —(CH$_2$)$_5$— and (CH$_2$)$_2$OOCH$_2$—.

When M is a branched or straight chain oxaaliphatic group having from 1 to about 20 carbon atoms, it may be, for example, a divalent alkoxylene group, such as ethoxylene, 2-methylethoxylene, propoxylene, butoxylene, pentoxylene, dodecyloxylene, hexadecyloxylene, and the like. When M is a branched or straight chain oxaaliphatic group, it may have the formula —(CH$_2$)$_a$—O—(CH$_2$)$_b$— wherein each of a and b, independently, is about 1 to about 7.

When M is a branched or straight chain oxaaliphatic group having from 1 to about 20 carbon atoms, it may also be, for example, a dioxaalkylene group such as dioxymethylene, dioxyethylene, 1,3-dioxypropylene, 2-methoxy-1,3-dioxypropylene, 1,3-dioxy-2-methylpropylene, dioxy-n-pentylene, dioxy-n-octadecylene, methoxylene-methoxylene, ethoxylene-methoxylene, ethoxylene-ethoxylene, ethoxylene-1-propoxylene, butoxylene-n-propoxylene, pentadecyloxylene-methoxylene, and the like. When M is a branched or straight chain, dioxyaliphatic group, it may have the formula —(CH$_2$)$_a$—O—(CH$_2$)$_b$—O—(CH$_2$)c—, wherein each of a, b, and c is independently from 1 to about 7.

When M is a branched or straight chain thiaaliphatic group, the group may be any of the preceding oxaaliphatic groups wherein the oxygen atoms are replaced by sulfur atoms.

When M is a branched or straight chain, aza-aliphatic group having from 1 to about 20 carbon atoms, it may be a divalent group such as —CH$_2$NHCH$_2$—, —(CH$_2$)$_2$NCH$_2$—, —CH$_2$(C$_2$H$_5$)NCH$_2$CH$_2$—, -n-C$_4$H$_9$NHCH$_2$—, -t-C$_4$H$_9$NHCH$_2$CH$_2$—, —CH$_2$(C$_3$H$_7$)N(CH$_2$)$_4$—, —C$_2$H$_5$(C$_2$H$_5$)NCH$_2$—, —CH$_2$(C$_8$H$_{17}$)NCH$_2$CH$_2$—, and the like. When M is a branched or straight chain, amino-aliphatic group, it may have the formula —(CH$_2$)$_a$N(R1)(CH$_2$)$_b$— where R1 is —H, aryl, alkenyl or alkyl and each of a and b is independently from about 1 to about 7.

x and y of Formula III each independently represent integers in the range of about 1 to about 1000, e.g., about 1, about 10, about 20, about 50, about 100, about 250, about 500, about 750, about 1000, etc.

The molar ratio of n:(x or y) in Formula III may vary greatly, typically between about 200:1 and 1:200. In certain embodiments, the ratio n:(x or y) is from about 100:1 to about 1:100, from about 50:1 to about 1:50, and alternatively, from about 25:1 to about 1:25. In certain embodiments, the ratio of n:x to n:y need not be the same. The molar ratio of x:y may also vary; typically, such ratio is about 1. Other possible embodiments may have ratios of 0.1, 0.25, 0.5, 0.75, 1.5, 2, 3, 4, 10 and the like.

A number of different polymer structures are contemplated by Formula III. For example, in certain polymers exemplified by Formula III, when the sum of t1, t2 . . . ts equals one for each of Z1 and Z2 and Q, M and X for each subunit ts are the same, then Formula III becomes the following Formula IIIa:

Formula IIIa

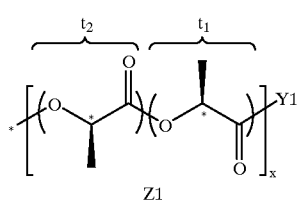

In certain embodiments of Formula IIIa (and other subject formulas), x and y may be even integers.

The above Formula III (and all of the subject formulae and polymers) encompass a variety of different polymer structures, including block copolymers, random copolymers, random terpolymers and segmented block copolymers and terpolymers. Additional structures for Z of subject monomeric units are set forth below, which exemplify in part the variety of structures contemplated by the present invention:

Formula IIIb

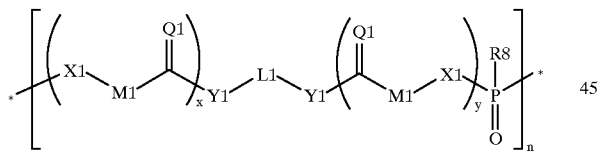

-continued

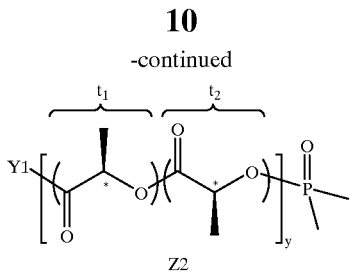

In Formula IIIb (and other formulas described below), there may be more ts subunits depicted of the same molecular identity of those depicted in the formulas. For example, in Formula IIIb, subunits $t_1$ and $t_2$ may be repeated in a sequence, e.g., alternating, in blocks (which may themselves repeat), or in any other pattern or random arrangement. Each subunit may repeat any number of times, and one subunit (e.g., $t_1$) may occur with substantially the same frequency, more often, or less often than another subunit (e.g., $t_2$), such that both subunits may be present in approximately the same amount, or in differing amounts, which may differ slightly or be highly disparate, e.g., one subunit is present nearly to the exclusion of the other. In certain embodiments, the chiral centers of each subunit may be the same or different and may be arranged in an orderly fashion or in a random sequence in each of Z1 and Z2.

Formula IIIc

In certain embodiments of Formula IIIc, the sum of the number of ts subunits in each of Z1 and Z2 is an even integer. As in other examples of Z1 and Z2, such as described above for Formula III, the ts subunits may be distributed randomly or in an ordered arrangement in each of Z1 or Z2.

Formula IIId

-continued

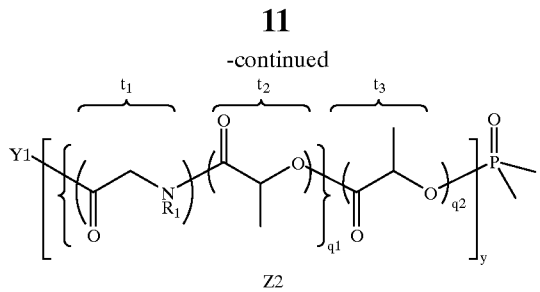

In Formula IIId, the subunit q1 is comprised of two ts subunits, which may be repeated and arranged as described above for Formula IIIb. In certain embodiments, q2 is an even integer, and in other embodiments, the subunits q1 and q2 may be distributed randomly or in an ordered pattern in each of Z1 and Z2. For example, subunits q1 and q2 may be repeated in a sequence, e.g., alternating, in blocks (which may themselves repeat), or in any other pattern or random arrangement. Each subunit may repeat any number of times, and one subunit (e.g., q1) may occur with substantially the same frequency, more often, or less often than another subunit (e.g., q2), such that both subunits may be present in approximately the same amount, or in differing amounts, which may differ slightly or be highly disparate, e.g., one subunit is present nearly to the exclusion of the other.

Formula IIIe

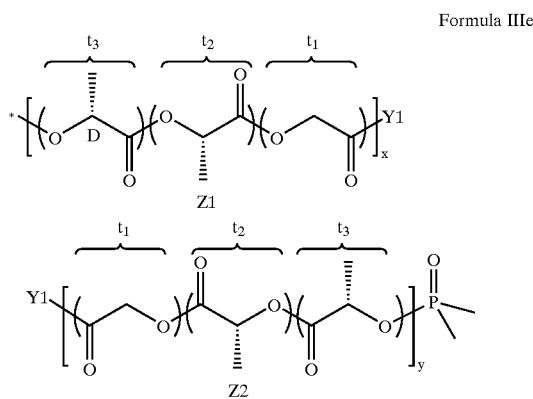

In certain embodiments of Formula IIIe, the sum of the ts subunits for each of Z1 and Z2 is an even integer. In other embodiments, the each of the subunits $t_1$, $t_2$, and $t_3$ may be distributed randomly or in an ordered arrangement in each of Z1 and Z2. For example, in Formula IIIe, subunits $t_1$, $t_2$, and $t_3$ may be repeated in a sequence, e.g., alternating, in blocks (which may themselves repeat), or in any other pattern or random arrangement. Each subunit may repeat any number of times, and one subunit (e.g., $t_1$) may occur with substantially the same frequency, more often, or less often than another subunit (e.g., $t_3$), such that the three subunits may be present in approximately the same amount, or in differing amounts, which may differ slightly or be highly disparate, e.g., two subunits are present nearly to the exclusion of the third.

In certain embodiments of Formula III, in which Q, M and X for each subunit are the same, Q1 represents 0, M represents a lower alkylene group, and X1 represents O or S, preferably O. For example, M may represent —CH (CH$_3$)— to result in a polymer of Formula III having a structure represented in Formula III;

Formula IIIf

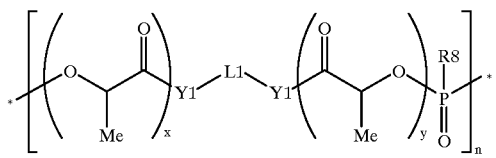

In certain embodiments of Formula IIIf, as further described in the Exemplification below, L1 represents a lower alkylene chain, such as ethylene, propylene, etc. In certain embodiments, all Y1's represent O. In certain embodiments, R8 represents —O-lower alkyl, such as —OEt.

In certain embodiments of polymers depicted by Formula III, the chirality of each subunit is identical, whereas in other embodiments, the chirality is different. By way of example but not limitation, in Formula IIIb above, if the chiral centers of all of the subunits are D-enantiomers or L-enantiomers, then the monomeric unit is effectively equivalent to D-lactic acid or L-lactic acid, respectively, thereby giving rise to a region similar to poly(D-lactic acid) or poly-(L-lactic acid), respectively. Conversely, if the two subunits in Formula IIIb are comprised of alternating D- and L-enantiomers (e.g., one unit of D-enantiomer, one unit of L-enantiomer, etc.), then the resulting polymeric region is analogous to poly(meso-lactic acid) (i.e., a polymer formed by polymerization of meso-lactide).

Finally, in certain embodiments of the monomeric units set forth in Formula III, in which the entire polymer may or may not be composed of such units, the following moieties for Y1, L1, R8 Qs, Xs and Ms may be used (with a variety of different x and y being possible):

| Abbreviation | All Y1's | L1 | R8 |
|---|---|---|---|
| P(LAEG-EOP) | O | —CH$_2$CH$_2$— | —OCH$_2$CH$_3$ |
| P(LAEG-HOP) | O | —CH$_2$CH$_2$— | —O(CH$_2$)$_5$CH$_3$ |
| P(D,L-AEG-EOP)* | O | —CH$_2$CH$_2$— | —OCH$_2$CH$_3$ |
| P(D,L-APG-EOP)* | O | —CH$_2$(CH$_3$)CH$_2$— | —OCH$_2$CH$_3$ |
| P(DAPG-EOP) | O | —CH$_2$(CH$_3$)CH$_2$— | —OCH$_2$CH$_3$ |
| P(LAPG-EOP) | O | —CH$_2$(CH$_3$)CH$_2$— | —OCH$_2$CH$_3$ |
| P(D,L-AHD-EOP)* | O | (cyclohexyl) | —OCH$_2$CH$_3$ |
| P(D,L-APG-HOP)* | O | —CH$_2$(CH$_3$)CH$_2$— | —O(CH$_2$)$_5$CH$_3$ |
| P(D,L-APG-EP)* | O | —CH$_2$(CH$_3$)CH$_2$— | —CH$_2$CH$_3$ |

-continued

| Abbreviation | All Qs | All Xs | M1 | M2 |
|---|---|---|---|---|
| P(LAEG-EOP) | O | O | —CH(CH₃)— (L) | N/A |
| P(LAEG-HOP) | O | O | —CH(CH₃)— (L) | N/A |
| P(D,L-AEG-EOP)* | O | O | —CH(CH₃)— (L or D) | —CH(CH₃)— (D or L) |
| P(D,L-APG-EOP)* | O | O | —CH(CH₃)— (L or D) | —CH(CH₃)— (D or L) |
| P(DAPG-EOP) | O | O | —CH(CH₃)— (D) | N/A |
| P(LAPG-EOP) | O | O | —CH(CH₃)— (L) | N/A |
| P(D,L-AHD-EOP)* | O | O | —CH(CH₃)— (L or D) | —CH(CH₃)— (L or D) |
| P(D,L-APG-HOP)* | O | O | —CH(CH₃)— (L or D) | —CH(CH₃)— (L or D) |
| P(D,L-APG-EP)* | O | O | —CH(CH₃)— (L or D) | —CH(CH₃)— (L or D) |

*For P(DAEG-EOP)-D/L* and P(DAPG-EOP)-D/L*, if the chiral carbon of M1 has configuration L, then M2 will have configuration D, and vice-versa. The order of the chiral centers in each subunit M1 and M2 for each Z1 and Z2 will be in random order.

In addition to the particular chiral version of the subject polymers described in the above table, polymers in which the chirality of Ms varies in each subunit M in the subject polymers are also possible. For instance, referring to P(D, L-A-EG-EOP) by example, a random order of D and L, in varying amounts, are possible for this polymer. In contrast, the table sets forth one such example in which a D and L chiral M are always adjacent, in equal amounts, but that need not always be the case.

In another embodiment of the present invention, the polymeric compositions of the present invention include one or more recurring monomeric units represented in general Formula IV:

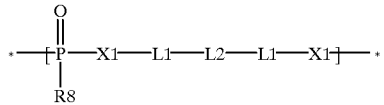

Formula IV wherein, independently for each occurrence:
  L2 is a divalent organic group as described in greater detail below; and
  the other moieties are as defined as above.

In Formula IV, L2 may be a divalent, branched or straight chain aliphatic group, a cycloaliphatic group, or a group of the formula:

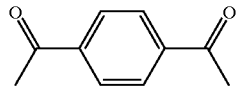

Specific examples of particular divalent, branched or straight chain aliphatic groups include an alkylene group with 1 to 7 carbon atoms, such as 2-methylpropylene or ethylene. Specific examples of cycloaliphatic groups include cycloalkylene groups, such as cyclopentylene, 2-methylcyclopentylene, cyclohexylene and 2-chiorocyclohexylene; cycloalkenylene groups, such as cyclohexenylene; and cycloalkylene groups having fused or bridged additional ring structures, such as tetralinylene, decalinylene and norpinanylene; or the like.

In certain embodiments of the subject formulas, each of L1 independently may be an alkylene group, a divalent cycloaliphatic group, a phenylene group or a divalent group of the formula:

wherein D is O, N or S and m is 0 to 3. Alternatively, L1 is a branched or straight chain alkylene group having from 1 to 7 carbon atoms, such as a methylene, ethylene, n-propylene, 2-methylpropylene, 2,2'-dimethylpropylene group and the like.

In certain embodiments of the monomeric units set forth in Formula IV, in which the entire polymer may or may not be composed of such units, the following moieties for X1, L1 and R8 may be used:

| Abbreviation | All X1 | All L1 | L2 | R8 |
|---|---|---|---|---|
| P(trans-CHDM/HOP) | O | —CH₂— | trans-1,4-cyclohexyl | —O(CH₂)₅CH₃ |
| P(cis- and trans-CHDM/HOP) | O | —CH₂— | mixture of trans-1,4-cyclohexyl and | —O(CH₂)₅CH₃ |

-continued

| Abbreviation | All X1 | All L1 | L2 | R8 |
|---|---|---|---|---|
| | | | cis-1,4-cyclohexyl | |
| P(trans-CHDM/BOP) | O | —CH$_2$— | trans-1,4-cyclohexyl | —O(CH$_2$)$_3$CH$_3$ |
| P(trans-CHDM/EOP) | O | —CH$_2$— | trans-1,4-cyclohexyl | —OCH$_2$CH$_3$ |

In another embodiment of the present invention, the polymeric compositions of the present invention include one or more recurring monomeric units represented in general Formula V:

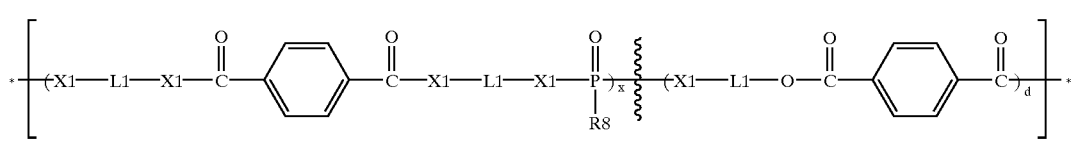

Formula V wherein, independently for each occurrence, d is equal to one or more, and optionally two, and all of the other moieties are as defined above.

In certain embodiments of the monomeric units set forth in Formula V, in which the entire polymer may or may not be composed of such units, the following moieties for X1, L1 and R8 may be used (with a variety of different x possible for each example):

| Abbreviation | All X1 | All L1 | R8 |
|---|---|---|---|
| P(BHET-EOP/TC) | O | —CH$_2$CH$_2$— | —OCH$_2$CH$_3$ |
| P(BHDPT-EOP/TC) | O | —CH$_2$CH(CH$_3$)$_2$CH$_2$— | —OCH$_2$CH$_3$ |
| P(BHDPT-HOP/TC) | O | —CH$_2$CH(CH$_3$)$_2$CH$_2$— | —OC$_6$H$_{13}$ |
| P(BHPT-EOP/TC) | O | —CH$_2$CH$_2$CH$_2$— | —OCH$_2$CH$_3$ |
| P(BHMPT-EOP/TC) | O | CH$_2$CH$_2$(CH$_3$)CH$_2$— | —OCH$_2$CH$_3$ |

In Formula V, the aryl groups represented therein may be substituted with a non-interfering substituent, for example, a hydroxy-, halogen-, or nitrogen-substituted moiety.

Other phosphorus-containing polymers which may be adapted for use in the subject invention are described in the art, including those described in U.S. Pat. Nos. 5,256,765 and 5,194,581; PCT publications WO 98/44020, WO 98/44021, and WO 98/48859; and U.S. application Ser. Nos. 09/053,649, 09/053,648 and 09/070,204. For all of the above-identified groups, non-interfering substituents also may be present.

In certain embodiments, the polymers are comprised almost entirely, if not entirely, of the same subunit. Alternatively, in other embodiments, the polymers may be copolymers, in which different subunits and/or other monomeric units are incorporated into the polymer. In certain instances, the polymers are random copolymers, in which the different subunits and/or other monomeric units are distributed randomly throughout the polymer chain. For example, a polymer having units of Formula II may consist of effectively only one type of such subunit, or alternatively two or more types of such subunits. In addition, a polymer may contain monomeric units other than those subunits represented by Formula II.

In other embodiments, the different types of monomeric units, be they one or more subunits depicted by the subject formulas or other monomeric units, are distributed randomly throughout the chain. In part, the term "random" is intended to refer to the situation in which the particular distribution or incorporation of monomeric units in a polymer that has more than one type of monomeric units is not directed or controlled directly by the synthetic protocol, but instead results from features inherent to the polymer system, such as the reactivity, amounts of subunits and other characteristics of the synthetic reaction or other methods of manufacture, processing or treatment.

In certain embodiments, the subject polymers may be cross-linked. For example, substituents of the polymeric chain, may be selected to permit additional inter-chain cross-linking by covalent or electrostatic (including hydrogen-binding or the formation of salt bridges), e.g., by the use of a organic residue appropriately substituted.

The ratio of different subunits in any polymer as described above may vary. For example, in certain embodiments, polymers may be composed almost entirely, if not entirely, of a single monomeric element, such as a subunit depicted in Formula II. Alternatively, in other instances, the polymers are effectively composed of two different subunits, in which the percentage of each subunit may vary from less than 1:99 to more than 99:1, or alternatively 10:90, 15:85, 25:75, 40:60, 50:50, 60:40, 75:25, 85:15, 90:10 or the like. For example, in some instances, a polymer may be composed of two different subunits that may be both represented by the generic Formula II, for example, but which differ in their chemical identity. In certain embodiments, the polymers may have just a few percent, or even less (for example, about 5, 2.5, 1, 0.5, 0.1%) of the subunits having phosphorous-based linkages. In other embodiments, in which three or more different monomeric units are present, the present invention contemplates a range of mixtures like those taught for the two-component systems.

In certain embodiments, the polymeric chains of the subject compositions, e.g., which include repetitive elements shown in any of the subject formulas, have molecular weights ranging from about 2000 or less to about 1,000,000 or more daltons, or alternatively about 10,000, 20,000, 30,000, 40,000, or 50,000 daltons, more particularly at least about 100,000 daltons, and even more specifically at least about 250,000 daltons or even at least 500,000 daltons. Number-average molecular weight (Mn) may also vary widely, but generally fall in the range of about 1,000 to about 200,000 daltons, preferably from about 1,000 to about 100,000 daltons and, even more preferably, from about 1,000 to about 50,000 daltons. Most preferably, Mn varies between about 8,000 and 45,000 daltons. Within a given sample of a subject polymer, a wide range of molecular weights may be present. For example, molecules within the sample may have molecular weights which differ by a factor of 2, 5, 10, 20, 50, 100, or more, or which differ from the average molecular weight by a factor of 2, 5, 10, 20, 50, 100, or more.

One method to determine molecular weight, both number average and weight average, is by gel permeation chromatography ("GPC"), e.g., through the use of mixed bed columns, $CH_2Cl_2$ solvent, light scattering detector, and off-line dn/dc. Polymer Laboratories and Waters. Laser light scattering devices are available from Wyatt Laboratories.

Exemplary approaches are as follows: weight-Average MWs from light scattering, Mw (LS), can be obtained using a system incorporating a Waters 510 pump, two Polymer Labs "Mixed C" columns in series, a Shimadzu CTO-10A column oven, a Waters 410 differential refractometer, and a MiniDawn multi-angle light scattering detector (Wyatt Technologies). Data can be obtained and analyzed on a PC using Astra software (Wyatt Technologies). Weight-Average MWs and Number-Average MWs from conventional calibration, Mw (CC) and Mn (CC) can be obtained using the system described above through the Waters 410 differential refractometer using a Polymer Labs data capture unit and Caliber software. A calibration curves can be obtained using Polymer Laboratories Easi-Cal PS-1 polystyrene standards. Data typically are reported in daltons. Inherent Viscosities (IV) can be obtained using polymer solutions of 0.45 to 0.55% w/v in a Canon-Fenske viscometer, size 25, at 30° C. Such data typically are reported in dL/g. Other methods are known in the art.

In certain embodiments, the intrinsic viscosities of the polymers generally vary from about 0.01 to about 2.0 dL/g in chloroform at 40° C., alternatively from about 0.01 to about 1.0 dL/g and, occasionally, from about 0.01 to about 0.5 dL/g.

The glass transition temperature (Tg) of the subject polymers may vary widely, and depend on a variety of factors, such as the degree of branching in the polymer components, the relative proportion of phosphorous-containing monomer used to make the polymer, and the like. When the article of the invention is a rigid solid, the Tg is often within the range of from about −10° C. to about 80° C., particularly between about 0 and 50° C. and, even more particularly between about 25° C. to about 35° C. In other embodiments, the Tg is preferably low enough to keep the composition of the invention flowable at body temperature. Then, the glass transition temperature of the polymer used in the invention is usually about 0 to about 37° C., or alternatively from about 0 to about 25° C.

In certain embodiments, substituents of the phosphorus atom, such as R8 in the above formulas, and other components of the subject polymers may permit additional inter-chain cross-linking by covalent or electrostatic interactions (including, for example, hydrogen-binding or the formation of salt bridges) by having a side chain of either of them appropriately substituted as discussed in greater detail below.

In other embodiments, the polymer composition of the invention may be a flexible or flowable material. By "flowable" is meant the ability to assume, over time, the shape of the space containing it at body temperature. This includes, for example, liquid compositions that are capable of being sprayed into a site; injected with a manually operated syringe fitted with, for example, a 23-gauge needle; or delivered through a catheter.

Also included by the term "flowable", are highly viscous, "gel-like" materials at room temperature that may be delivered to the desired site by pouring, squeezing from a tube, or being injected with any one of the commercially available power injection devices that provide injection pressures greater than would be exerted by manual means alone for highly viscous, but still flowable, materials. When the polymer used is itself flowable, the polymer composition of the invention, even when viscous, need not include a biocompatible solvent to be flowable, although trace or residual amounts of biocompatible solvents may still be present.

In certain embodiments, the subject polymers are soluble in one or more common organic solvents for ease of fabrication and processing. Common organic solvents include such solvents as chloroform, dichloromethane, dichloroethane, 2-butanone, butyl acetate, ethyl butyrate, acetone, ethyl acetate, dimethylacetamide, N-methyl pyrrolidone, dimethylformamide, and dimethylsulfoxide.

The following chart provides an explanation of some of the more frequently employed abbreviations in this application:

| | |
|---|---|
| bis(hydroxyethyl) terephthalate | BHET |
| 1,4-cyclohexane dimethanol | CHDM |
| 4-dimethylaminopyridine | DMAP |
| ethylene glycol | EG |
| ethyl dichlorophosphate | $EOPCl_2$ |
| ethyl dichlorophosphonate | $EPCl_2$ |
| 1,6 hexanediol | HD |
| hexyl dichlorophosphate | $HOPCl_2$ |
| N-methylmorpholine | NMM |
| propylene glycol | PG |
| terephthaloyl chloride | TC |
| Triethylamine | TEA |
| tetrahydrofuran | THF |
| trimethylene chloride | TMC |

In view of the above definitions and explanations, the present invention provides methods for producing polymers, such as phosphopolymers (e.g., polyphosphoesters), and polymers, such as phosphopolymers (e.g., polyphosphoesters), made by such methods.

The present invention also provides methods of purifying a polymer preparation. In accordance with one aspect of the invention, purification methods comprising contacting the polymer preparation with at least one ion exchange resin are provided. Polymer preparations refer to a mass, collection, concentration or aggregation of polymers, and can be in a solid form or in solution. In purifying, the preparation can be contacted with an acidic resin and a basic resin, such as a strong acidic resin and a weak basic resin. The ion exchange resins can remove a variety of contaminants from a polymer preparation, such as amines from the reaction and metal contaminants arising from polymerization catalysts like tin and zinc. Polymer preparations having a reduced level of metal contaminants that are obtainable by these methodologies also are provided. The polymer preparations can comprise phosphopolymers, including polyphosphoesters.

In accordance with another aspect of the invention, methods of producing a phosphopolymer, comprising reacting a reactive prepolymer, preferably dissolved in an appropriate solvent with an organophosphorous compound in the presence of at least one acid scavenger, preferably until substantially all of the organophosphorous compound has bound with the prepolymer to form a phosphopolymer; and purifying the phosphopolymer. A reactive prepolymer should have one or more, preferably at least two, reactive end groups. The reactive end groups include, but are not limited to, primary and secondary alcohol, amine, and thiol groups.

The reaction can be stopped/quenched with an alcohol prior to the purification. The reaction can performed at a warm temperature or a cold temperature. The purification preferably employs at least one ion exchange resin. The prepolymer can be formed from one or more monomers selected from the group consisting of D,L-lactide, trimethylene chloride, L-lactide, caproloactone, dioxanone, propylene glycol, ethylene glycol, 1,6 hexanediol, glycolide, 1,4-cyclohexane dimethanol, terephthaloyl chloride and bis (hydroxyethyl) terephthalate, for example. The organophosphorous compound can be selected from the group consisting of alkyl dichlorophosphates, alkyl dichlorophosphonates, alkyl dichlorophosphites, aryl dichlorophosphates, aryl dichlorophosphonates, aryl dichlorophosphites, alkylaryl dichlorophosphates, alkylaryl dichlorophosphonates, and alkylaryl dichlorophosphites. Exemplary organophosphorous compounds include ethyl dichlorophosphate, ethyl dichlorophosphonate, hexyl dichlorophosphate and hexyl dichlorophosphonate, for example.

The prepolymer can be formed using a variety of catalysts, including stannous catalysts and/or zinc catalysts, for example. Appropriate acid scavengers include the tertiary amines, such as triethylamine, and substituted aminopyridines, such as 4-dimethylaminopyridine, although other acid scavengers available to the skilled person can be employed according to the teachings contained herein, such as N,N,N-triethylamine, N,N-dimethyl-n-phenyl amine; N-methylmorpholine, pyridine, triethylenediamine, POLY-DMAP (poly 4-dimethylaminopyridine), and REILLEX 402. In many instances, the substituted aminopyridines, such as DMAP, cause larger molecular weight polymers to form. See Holfe et al., *Angew. Chem. Int. Ed. Engl.* 17: 569 (1978); Scriven, *Chem. Soc. Rev.* 12:129 (1983). Phosphopolymers and phosphopolymer preparations obtainable from these methodologies also are provided.

In accordance with another aspect of the invention, there are provided methods of producing phosphopolymers, comprising reacting a prepolymer (as described above), preferably dissolved in an appropriate solvent, with an organophosphorous compound (as described above) in the presence of at least one acid scavenger (as described above) at a cold temperature, preferably until substantially all of the organophosphorous compound has bound with the prepolymer to form a phosphopolymer; stopping/quenching the reaction; contacting the phosphopolymer with at least one ion exchange resin, which purifies the phosphopolymer; and removing the ion exchange resin, which can be done via filtration. The reaction can be stopped/quenched with an alcohol. The acidic ion exchange resins and basic ion exchange resins can be contacted with the phosphopolymer. An acidic resin exchanges cations, and a basic resin exchanges anions. Resins can be considered strong or weak, as is known in the field. Appropriate resins include Dowex MR3, MR3C, HCR-S, M-43, DR-2030, MSC-1, Monosphere 66 and 77; Marathon C; 50WX4; Rohm & Haas Amberlyst 15 and A21; and Mitsubishi Diaion WA30. Other resins available to the skilled person can be employed in accordance with the teachings contained herein. The methods can further comprise concentrating the phosphopolymer; precipitating the phosphopolymer; and drying the phosphopolymer.

The prepolymer can be formed from one or more monomers selected from the group consisting of D,L-lactide, trimethylene carbonate, L-lactide, caproloactone, dioxanone, propylene glycol, ethylene glycol, 1,6 hexanediol, glycolide, 1,4-cyclohexane dimethanol, terephthaloyl chloride and bis(hydroxyethyl) terephthalate, for example, and the organophosphorous compound can be selected from the group consisting of alkyl dichlorophosphates, alkyl dichlorophosphonates, alkyl dichlorophosphites, aryl dichlorophosphates, aryl dichlorophosphonates, aryl dichlorophosphites, alkylaryl dichlorophosphates, alkylaryl dichlorophosphonates, and alkylaryl dichlorophosphites, for example. Exemplary organophosphorous compounds include ethyl dichlorophosphate, ethyl dichlorophosphonate, hexyl dichlorophosphate and hexyl dichlorophosphonate. The prepolymner can be formed using a stannous catalysts and/or zinc catalysts, for example.

Appropriate acid scavengers include tertiary amines, such as triethylamine, and substituted aminopyridines, such as 4-dimethylaminopyridine, although other acid scavengers available to the skilled person can be employed according to the teachings contained herein. Phosphopolymers and phosphopolymer preparations obtainable from these methodologies also are provided.

In accordance with still another aspect of the invention, there are provided methods of producing a polyphosphoesters comprising (1) reacting at least one type of diol with at least one type of organophosphorus compound in the presence of at least one acid scavenger until substantially all of the organophosphorus compound has bound with the diol to form a polyphosphoester and (2) purifying the polyphosphoester. The diol can be a straight-chain aliphatic diol, a branched aliphatic diol, a cycloaliphatic diol, an aryl, and can be monomeric or polymeric. Illustrative diols include cyclohexane dimethanol, ethylene glycol, 1,4-benzenedimethanol, 1,6 hexane diol, bis(hydroxyethyl terephthalate) and propylene glycol. Polyethylene glycols of various molecular weights, e.g., about 200 Da, about 500 Da, about 5000 Da or larger also can be employed according to the invention, and such polyethylene glycols are readily obtained by the skilled person. The diol can substitute for or be in addition to a prepolymer. Preferably, the diol is present in stoiciometric amounts to the organophosphate.

Appropriate acid scavengers include tertiary amines, such as triethylamine, and substituted aminopyridines, such as 4-dimethylaminopyridine, although other acid scavengers available to the skilled person can be employed according to the teachings contained herein. Phosphopolymers and phosphopolymer preparations obtainable from these methodologies also are provided.

In accordance with still another aspect of the invention, there are provided methods of producing polyphosphoesters, comprising: reacting a prepolymer with an organophosphorous compound in the presence of at least one acid scavenger at a cold temperature until substantially all of the organophosphorous compound has bound with the prepolymer to form a polyphosphoester; stopping the reaction; contacting the polyphoester with an acidic ion exchange resin and a basic ion exchange resin; and removing the acidic and basic ion exchange resins to yield a purified polyphoester that has a reduced level of metal contaminants, such as tin and zinc. Polyphoesters and polyphoester preparations obtainable by these methods also are provided.

These and other aspects of the invention will become apparent in view of the teachings, examples and data contained herein.

Purification Methodologies

One aspect of the present invention advantageously employs ion exchange resins ("IERs") to remove ionized and/or or ionizable contaminants from any polymer process stream, and is particularly useful for polymers to be used in pharmaceutical, medical device, and food product settings. Preferably, at least 50% of the contaminants are removed, more preferably at least 70% of the contaminants are removed, and still more preferably at least 90% of the contaminants are removed. For example, in the case of metal contaminants, the metal concentration following purification is 20 ppm or lower, preferably 10 ppm or lower, and still more preferably 5 ppm or lower.

Typically, at a given stage of a process stream, a polymer product is in the form of a solute. Alternatively, a solid polymer preparation can be solubilized in an appropriate solvent. Whatever the approach, post-polymerization polymers are contaminated with process byproducts. In order to remove these contaminants, at an appropriate stage of the process, the polymer solute is contacted with one or more IERs to remove the contaminants. The polymer solute/IER mixture is usually agitated in order to facilitate contact between the solution and the IER, which maximizes contaminant removal. Exemplary approaches for agitation include mechanical shaking or spinning a vessel containing the polymer solute/IER mixture, or internal stirring using a paddle, blade or stir bar. The IER treatment can be from minutes to days, preferably ranging about 2 to about 24 hours, and preferably is performed at ambient temperature or below, depending upon the polymer and the solvent. Exemplary temperatures include −78° C. to 30° C., preferably within about −10° C. to 25° C., and more preferably within about −5° C. to 20° C., although any temperature within or about the above intervals are appropriate for use according to the invention. After an appropriate contact period, the IER is removed, typically through filtration and/or sedimentation.

Typical contaminants include cationic and anionic species that exist in solution. Cationic contaminants include:
(1) Alkali metals, for example lithium and sodium;
(2) Alkali earth metals, for example magnesium and calcium;
(3) Transition metals, for example iron, nickel and zinc;
(4) Other main group metals, for example aluminum and tin;
(5) Heavy metals, for example lead, cadmium and mercury; and
(6) Ammonium cations and organic cationic species, for example amines like protonated organic amines.

Other types of cationic species include electrically neutral species like organic amines that can react with strong acid IERs in protonated form to form cationic species, for example amine hydrochloride. Thus, any cationic contaminant or neutral contaminant that can be protonated to form a cationic species can be removed with ER. In the context of polymers for pharmaceutical and other medical uses, the need to remove tin and zinc is typical because these metal contaminants come from commonly used catalysts.

Anionic contaminants include:
(1) Halides, for example chlorides and bromides;
(2) Monoatomic main-group anions, for example sulfide and selenide;
(3) Polyatomic anions, for example nitrate, sulfate and phosphate; and
(4) Other organic anions, for example carboxylates, organonitrates and organophosphates.

Finally, electrically neutral species, like inorganic acids (for example, hydrochloric acid and nitric acid), can react with base IERs to form water and anionic species, which in turn can be removed by the IERs.

Solvents, including mixtures thereof, that can be used to dissolve the polymers include:
(1) Water;
(2) Alcohols, for example methanol and ethanol;
(3) Ketones, for example acetone and 2-butanone;
(4) Ethers, for example diethyl ether and tetrahydrofuran;
(5) Esters, for example ethyl acetate;
(6) Halogenated hydrocarbons, for example carbon tetrachloride, chloroform, dichloromethane, 1,2 dichloroethane and methylene chloride;
(7) Hydrocarbons, for example toluene, benzene and hexane; and
(8) Other organics, for example dimethlylsulfoxide.

The IERs to be employed must be compatible with the polymer and the solvent in which the polymer is dissolved. Preferably, the IER is wetted with the same solvent, or compatible solvent(s), used to dissolve the polymer. Appropriate resins to be used according to the invention include:
(1) Dowex MR3 and MR3C (mixed ion exchange resins containing Marathon A (strong base) and Marathon C (strong acid) resins);
(2) Dowex HCR-S (strong acid—styrene-DVB, gel matrix with a sulfonic acid functional group);
(3) Dowex M-43 (weak base resin (tertiary amine) made from macroporous styrenic plastic beads);
(4) Dowex DR-2030 (strong acid resin—styrenic plastic bead fuinctionalized with sulfonic acid groups, often referred to as a catalyst);
(5) Dowex MSC-1 (Strong acid resin);
(6) Dowex Monosphere 66 and 77 (basic resins);
(7) Marathon C (strong acid);
(8) Marathon A (strong base);
(9) 50WX4 (Strong acid);
(10) Rohm & Haas Amberlyst 15 (Acidic resin);
(11) Rohm & Haas Amberlyst A21 (Basic resin); and
(12) Mitsubishi Diaion WA30 (Basic resin).

The above listing is exemplary, and thus is not exhaustive. Other resins available to the skilled person can be employed according to the teachings contained herein.

At least one ion exchange resin is employed according to one aspect of the invention. Preferably, more than one ion exchange resin is employed, for example a strong acid resin and a weak basic resin are used to remove contaminants from a polymer.

The usefulness of IERs is demonstrated by the following, non-limiting, examples.

EXAMPLE 1

Two batches of poly(lactide) were prepared using zinc acetate as a catalyst Samples 1 and 2 were each prepared by mixing 10.0 g of DL-lactide, 0.084 g of 1-dodecanol, and 0.0050 g of zinc acetate (in the form of 0.050 ml of solution of 0.1 g/ml zinc acetate in DMSO) in 20 ml Teflon vials. The vials were suspended in oil baths and heated to 145° C. Vials were removed from the oil baths, shaken vigorously, and then returned to the oil bath every 15 minutes for 2.5 hours after the initial mixing. The vials were allowed to stand in the oil bath for 16 hours, and then the vials were allowed to cool to room temperature, where thereafter the cylindrical polymer masses were removed from the vials.

The weight average molecular weights (Mw) were 54,400 daltons (sample 1) and 43,700 daltons (sample 2), as determined by gel permeation chromatography. The polymer samples were dissolved in chloroform to a concentration of 0.3 g/ml and placed in sealed glass vessels. Samples were removed to conduct an analysis of zinc content.

The solutions also were treated with 1.4 g of Dowex DR-2030 IER and 1.4 g of Dowex M-43 EER per gram of polymer. The IERs were wetted with chloroform prior to use. The process conditions are set forth below.

| Sample | g Polymer | g DR-2030 | g M-43 | ml chloroform |
|--------|-----------|-----------|--------|---------------|
| 1 | 6.35 | 8.89 | 8.89 | 21 |
| 2 | 5.55 | 7.77 | 7.77 | 19 |

The samples with the IER were shaken on a mechanical shaker for 2 hours at ambient temperature (20–25° C.). The IERs then were removed by vacuum filtration. The resulting clear solutions were then concentrated, and then the polymers were precipitated in methanol. The solids were then isolated and vacuum dried, which in turn were frozen in liquid nitrogen, ground to a fine powder in a stainless steel blender, and then vacuum dried again. A zinc analysis was then performed, which provided the following results:

| Sample | Zinc before treatment (ppm) | Zinc after treatment (ppm) |
|--------|-----------------------------|----------------------------|
| 1 | 150 | <16 |
| 2 | 480 | <16 |

These results show the effectiveness of the IERs in removing catalyst-originated zinc contaminants from polymer preparations to yield reduced contaminant levels.

EXAMPLE 2

Thirty six samples of polyphosphoesters were produced using tin catalysts. Samples 1 and 2 were prepared according to Example 8. Sample 4 was prepared according to Example 9. Sample 5 was prepared according to Example 10.

Sample 3 was prepared as follows: A 14 g portion of propylene glycol was weighed into a 500 ml 3-necked round bottom flask. The flask was equipped with a gas joint, a stirrer bearing/shaft/paddle assembly, and a Teflon-coated thermocouple. The reaction apparatus was placed in a pre-heated oil bath at 130° C. and purged with nitrogen for one minute. A 283 g portion of D,L-Lactide was added using a powder addition funnel over a period of 45 minutes. The reaction apparatus was then immersed in the oil so that the oil level was at the bottom of the ground glass joints. The mixture was stirred until all of the solid monomer had melted and the internal temperature had reached approximately 125° C. At this time, a volume of solution of stannous octoate in chloroform equivalent to approximately 200 ppm (117 ppm Sn) was added to the melt using a syringe. The mixture was allowed to stir for approximately 4 hours. The residual monomer was then removed using vacuum for approximately 2 hours. The prepolymer was left at ambient conditions under nitrogen overnight. Then, a 113 ml portion of chloroform was used to dissolve and transfer the prepolymer to a pre-chilled reactor that contained 2.5 equivalents (based on propylene glycol) of triethylamine and 0.5 equivalents of 4-dimethylaminopyridine dissolved in 400 ml of chloroform. The reactor was equipped with a stirrer bearing/shaft/turbine assembly, a gas joint, a tubing adapter, and a Teflon-coated thermocouple. With stirring and chilled recirculation on the jacket, the solution was cooled to below –15° C. A solution of 1 equivalent (based on propylene glycol, approximately 30 g) of distilled ethyl dichlorophosphate ($EOPCl_2$) in 95 ml chloroform was prepared in a round bottom flask equipped with a tubing adapter and a gas joint. The $EOPCl_2$/chloroform solution was added over a period of not less than 2.5 hours, maintaining the internal temperature at approximately –10° C. Tubing was connected to the gas joints of the flask and reactor to equalize the pressure during the addition. Following the addition, a 15 ml portion of chloroform was added to rinse the flask, feed lines, and pump. The reaction mixture was stirred for 1 hour at low temperature (0° C.) before the reaction was quenched with 20 ml of anhydrous methanol. The polyphosphoester, already dissolved in chloroform, was then ready for treatment with the IERs.

Samples 6-36 were prepared from propylene glycol, D,L-lactide, and ethyl dichlorophosphate ($EOPCl_2$). The prepolymer polymerization time, the prepolymer polymerization temperature, the stannous octoate level, the temperature of the vacuum stripping process, and the duration of the vacuum stripping process were varied in the ranges specified below. The processes were as follows:

All glassware was dried for a minimum of 2 hours at 105° C. and allowed to cool in a desiccator or cooled under a stream of argon gas to ambient temperature. A 28.5 g portion of D,L-lactide and 1.5 g of PG (molar ratio, 10:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 125° C. to 160° C., connected to an argon source with an oil bubbler, and stirred at a moderate speed until all of the solid monomer had melted.

Then, a volume of stock stannous octoate solution (about 130 mg/ml in toluene) equivalent to 100 ppm to 500 ppm stannous octoate or 30 ppm to 150 ppm Sn was added to the melt using a syringe. The reaction mixture was allowed to stir under a slight argon pressure for approximately 4 to 24 hours. The oil bath temperature was then reduced to between 105° C. and 135° C. and the residual monomer was removed under vacuum. The upper parts of the reaction assembly were heated gently with a heat gun to aid in the monomer removal. The total time under vacuum was 1 to 4 hours.

The prepolymer was dissolved in 84 ml of chloroform with stirring and 2.5 equivalents of TEA and 0.5 equivalents of DMAP were added to the stirring reaction mixture using a powder funnel. The reaction mixture was chilled to about –5° C. A solution of about 1 equivalent of distilled ethyl dichlorophosphate ($EOPCl_2$) in 10 ml of chloroform was prepared in a dropping funnel. The solution in the funnel was added slowly to the reaction mixture over a period of 0.5 hour. After the addition was complete, the reaction mixture was allowed to stir at low temperature for 1 hour at –5° C. The reaction was then quenched with 1 ml of anhydrous methanol and stirred for another five minutes. The polymer, already dissolved in chloroform, was then ready for treatment with EERs.

Samples 1–36, dissolved in chloroform, were treated with EERs, specifically Dowex DR-2030 (1 g of resin/g polymer) and Dowex M-43 (1.2 g of resin/g polymer), which were pre-wetted with chloroform. The polymer-resin mixture was stirred, and the IERs were removed through filtration after various contact time at various temperatures. The polymer solution was concentrated, and then either precipitated with a non-solvent and vacuum dried or just dried in a vacuum oven at ambient temperature. The solid polymer was recovered and then tested for tin content. The results are set forth below for various samples.

| Sample | Temperature (° C.) | Time (hours) | Initial tin (ppm) | % Tin removal |
|---|---|---|---|---|
| 1 | 0 | 16 | 35 | 49 |
| 2 | 0 | 16 | 35 | >80 |
| 3 | 0 | 2.25 | 62 | 74 |
| 4 | 5 | 12 | 58 | 86 |
| 5 | 9 | 16 | 605 | 94 |
| 6 | 25 | 2 | 29 | 73 |
| 7 | 25 | 2 | 146 | 88 |
| 8 | 25 | 2 | 29 | 66 |
| 9 | 25 | 2 | 146 | 86 |
| 10 | 25 | 2 | 29 | 69 |
| 11 | 25 | 2 | 146 | 49 |
| 12 | 25 | 2 | 146 | 88 |
| 13 | 25 | 2 | 29 | 52 |
| 14 | 25 | 2 | 146 | 83 |
| 15 | 25 | 2 | 88 | 78 |
| 16 | 25 | 2 | 29 | 62 |
| 17 | 25 | 2 | 29 | 39 |
| 18 | 25 | 2 | 29 | 69 |
| 19 | 25 | 2 | 146 | 86 |
| 20 | 25 | 2 | 29 | 11 |
| 21 | 25 | 2 | 29 | 35 |
| 22 | 25 | 2 | 29 | 66 |
| 23 | 25 | 2 | 88 | 92 |
| 24 | 25 | 2 | 146 | 91 |
| 25 | 25 | 2 | 29 | −2 |
| 26 | 25 | 2 | 29 | 59 |
| 27 | 25 | 2 | 146 | 91 |
| 28 | 25 | 2 | 146 | 82 |
| 29 | 25 | 2 | 146 | 81 |
| 30 | 25 | 2 | 146 | 84 |
| 31 | 25 | 2 | 29 | 42 |
| 32 | 25 | 2 | 88 | 67 |
| 33 | 25 | 2 | 29 | 59 |
| 34 | 25 | 2 | 29 | 25 |
| 35 | 25 | 2 | 88 | 65 |
| 36 | 25 | 2 | 29 | 59 |

In 35 of 36 tests, the use of IERs showed significant reduction in metal contamination.

EXAMPLE 3

Using the approach of Example 2, polyphosphoesters were treated and tested.

First, polymer samples 2 and 3 were prepared and treated with IERs according to Example 11. Sample 1 was prepared from propylene glycol, D,L-lactide, and ethyl dichlorophosphate ($EOPCl_2$) as follows: A 497.3 g portion of D,L-lactide and 25.2 g of PG molar ratio, 10:1) were weighed into a 1 liter jacketed reactor. The reactor was equipped with a gas joint and a stirrer bearing/shaft/paddle assembly. The reaction apparatus was maintained at 100 to 110° C. and stirred at a moderate speed until all of the solid monomer had melted.

Then, a volume of stock stannous octoate solution equivalent to 120 ppm stannous octoate was added to the melt using a syringe. The reaction mixture was allowed to stir for approximately 19 hours. The oil bath temperature was then reduced to 100° C. and the residual monomer was removed under vacuum for 3 hours.

The prepolymer was then dissolved in 1400 ml of methylene chloride with stirring and 2.5 equivalents of TEA and 0.5 equivalents of DMAP were added to the stirring reaction mixture using a powder funnel. The reaction mixture was chilled to about −5° C. A solution of about 1 equivalent (54.5 g) of distilled ethyl dichlorophosphate ($EOPCl_2$) in 150 ml of methylene chloride was prepared. The solution was added slowly to the reaction mixture over a period of 4 hours. After the addition was complete, the reaction mixture was allowed to stir at low temperature for 12 hours at 1° C. The reaction was then quenched with 34 ml of anhydrous methanol and stirred for another five minutes.

Next, the reaction mixture was filtered into a flask and mixed with Dowex HCR-S and Dowex M-43, and stirred for 1 hour. The resin was removed from the reaction mixture by vacuum filtration through Whatman 4 filter paper. The resin was washed with about one bed volume (i.e., a volume sufficient to submerge the resin) of dichloromethane and the filtrate was concentrated. Ethyl ether was added to the viscous filtrate. This was then poured into petroleum ether to precipitate the polymer. The polymer mass was dried under vacuum.

Differences in solvents and ion exchange resins used are noted in the below table.

| Sample | Solvent | Acidic resin | Basic resin | Temp. (° C.) | Time (hours) | Initial Tin (ppm) | % Tin removal |
|---|---|---|---|---|---|---|---|
| 1 | Methylene Chloride | Dowex HCR-S | Dowex M-43 | 25 | 1 | 37 | 78 |
| 2 | 51% Chloroform and 49% Methylene Chloride | Dowex DR-2030 | Dowex M-43 | −7 | 15 | 118 | 96 |
| 3 | 42% Chloroform and 58% Methylene Chloride | Dowex DR-2030 | Dowex M-43 | 21 | 15 | 115 | 94 |

Significant metal contaminant reduction was achieved even when different solvents and ion exchange resins were employed.

EXAMPLE 4

Polyphosphoester samples produced using tin catalysts as follows: a 100 g portion of propylene glycol was weighed into a 3000 ml 3-necked round bottom flask. The flask was equipped with a gas joint, a stirrer bearing/shaft/paddle assembly, and a Teflon-coated thermocouple. The reaction apparatus was placed in a preheated oil bath at 130° C. and purged with nitrogen for one minute. A 2000 g portion of D,L-Lactide was added using a powder addition funnel over a period of 45 minutes. The reaction apparatus was then immersed in the oil so that the oil level was at the bottom of the ground glass joints. The mixture was stirred until all of the solid monomer had melted and the internal temperature had reached approximately 125° C. At this time, a volume of solution of stannous octoate in chloroform equivalent to approximately 400 ppm (117 ppm Sn) was added to the melt using a syringe. The mixture was allowed to stir for approximately 2 hours. The residual monomer was then removed using vacuum for approximately 0.5 hour. A 2500 ml portion of chloroform was used to dissolve and transfer the prepolymer to a pre-chilled, 20 liter jacketed reactor, which contained 2.5 equivalents (based on propylene glycol) of triethylamine and 0.5 equivalents of 4-dimethylaminopyridine dissolved in 3600 ml of chloroform. The reactor was equipped with a stirrer bearing/shaft/turbine assembly, a gas joint, a tubing adapter, and a Teflon-coated thermocouple. With stirring and chilled recirculation on the jacket, the solution was cooled to below −15° C. A solution of 1 equivalent (based on propylene glycol, approximately 215 g) of distilled ethyl dichlorophosphate ($EOPCl_2$) in 650 ml chloroform was prepared in a 1000 ml 3-necked round bottom flask equipped with a tubing adapter and a gas joint. The $EOPCl_2$/chloroform solution was added using a piston pump and Teflon tubing over a period of 60 minutes, maintaining the internal temperature at approximately −10° C. Tubing was connected to the gas joints of the flask and reactor to equalize the pressure during the addition. Following the addition, a 50 ml portion of chloroform was added to rinse the flask, feed lines, and pump. The reaction mixture was stirred for 1 hour at low temperature (−8° C. after 1 hour) before the reaction was quenched with 140 ml of anhydrous methanol.

Aliquots of the polymer/chloroform solution (0.2 g/ml) were treated with WERs (1.4 g of both acidic and basic resin per g polymer). The IERs were wetted in about 2.5 ml methylene chloride per gram of resin. The chilled polymer—resin mixture (at about 4° C.) was stirred for about 15 hours. The IERs were then removed by filtration. The polymer solution was concentrated by vacuum oven at ambient temperature. The recovered solid polymer was sampled for tin content. It was determined that the theoretical maximum tin concentration was 117 ppm. The results are set forth in the below table.

| Sample | Acidic resin | Basic resin | Final tin concentration (ppm) | % removal |
|---|---|---|---|---|
| Control | None | None | 90 | 0 |
| 1 | Dowex MSC-1 | Dowex Monosphere 66 | 27 | 81 |
| 2 | Dowex MSC-1 | Dowex Monosphere 77 | <9 | >90 |
| 3 | Dowex MSC-1 | Mitsubishi Diaion WA30 | <10 | >89 |
| 4 | Dowex MSC-1 | Rohn & Haas Amberlyst A21 | <9.2 | >90 |
| 5 | Rohn & Haas Amberlyst 15 Dry | Dowex Monosphere 66 | <8.4 | >91 |
| 6 | Rohn & Haas Amberlyst 15 Dry | Dowex Monosphere 77 | <10.2 | >89 |
| 7 | Rohn & Haas Amberlyst 15 Dry | Mitsubishi Diajon WA30 | <9 | >90 |
| 8 | Rohn & Haas Amberlyst 15 Dry | Romn & Haas Amberlyst A21 | <9.4 | >90 |
| 9 | Dowex DR-2030 | Dowex M-43 | <9.6 | >89 |

These data show that other types of IERs, when employed according to the invention, are effective at metal contaminant removal to reduce overall contaminant levels.

EXAMPLE 5

The following study was performed using commercially available MEDISORB polymers from Alkermes. A sample of the polymers was dissolved in methylene chloride (0.25 g/ml). The dissolved polymers were mixed with Dowex DR-2030 and Dowex M-43 resins at 1.4 grams of resin each per gram of polymer. The resins were wetted in about 2.5 ml of methylene chloride per gram resin. The chilled polymer—resin mixture (at about 4° C.) was stirred for about 16 hours. The IERs were then removed by filtration. The polymer solution was concentrated by vacuum oven at ambient temperature. The recovered solid polymer was sampled for tin content. The results are set forth in the below table.

| Sample | Polymer | Initial Tin Content (ppm) | Final Tin Content (ppm) | % Tin Removal |
|---|---|---|---|---|
| 1 | 5050 DL Low IV (co-polymer of d,1-lactide and glycolide) | 92 | <5 | >95 |
| 2 | 6535 DL High IV (co-polymer of d,1-lactide and glycolide) | 98 | 16 | 84 |
| 3 | 6535 DL Low IV (co-polymer of d,1-lactide and glycolide) | 94 | <5 | >95 |
| 4 | 100 DL Low IV (polymer of d,1-lactide) | 73 | 8.9 | 88 |
| 5 | 100 DL High IV (polymer of d,1-lactide) | 75 | 5.3 | 93 |

-continued

| Sample | Polymer | Initial Tin Content (ppm) | Final Tin Content (ppm) | % Tin Removal |
|---|---|---|---|---|
| 6 | 5050 DL 2A (co-polymer of d,1-lactic acid and glycolic acid) | 42 | <5 | >88 |
| 7 | 7525 DL Low IV (co-polymer of d,1-lactide and glycolide) | 73 | 6.3 | 91 |
| 8 | 8515 DL High IV (co-polymer of d,1-lactide and glycolide) | 74 | <5 | >93 |
| 9 | 7525 DL High IV (co-polymer of d,1-lactide and glycolide) | 74 | 7.4 | 90 |
| 10 | 5050 DL 4A (co-polymer of d,1-lactide and glycolide) | 77 | <5 | >94 |

The above data demonstrate that IERs can be used to remove contaminants from a wide range of polymer preparations, and thus a polymer preparation treated according to the invention will have reduced levels of contamination, such as metal contamination, as compared to commercially available polymers.

Phosphopolymer Production Methodologies

The present invention also provides methods for producing polymers, for example phosphopolymers. It also provides phosphopolymers (for example, polyphosphoesters) made by such methods. Various types of phosphopolymers that are amenable to production according to the present invention are disclosed in U.S. Pat. Nos. 5,952,451 and 6,008,318; and PCT publications WO 98/44020, WO 98/44021, and WO 98/48859.

The present invention includes, but is not limited to, warm and cold reaction approaches, and many of the processes steps recited therein can be jointly employed in either approach, such as purification techniques described above, as will be recognized by the skilled person in view of the teachings contained herein. Suitable purification techniques can be employed to remove some or all of the impurities, such as undesired contaminants or reaction by-products, from the phosphopolymers or compositions containing such phosphopolymers, such as the polyphosphoesters. The approaches are described below, although the skilled person will recognize that many process steps are interchangeable.

One approach for the production of polyphosphoesters is a dehydrochlorination reaction between a phosphorodihalo compound, a type of organophosphorous compound, and a diol. The overall reaction can be described as follows:

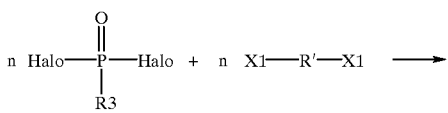

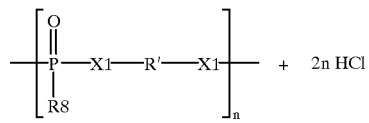

As is apparent from the schematic, the reaction generates 2 moles of acid for every mole of the phosphorodihalo compound (in the above case, reaction with a phosphorodichloro compound generates the hydrochloric acid). Preferably, Halo is Br, Cl or I, and R3 is H, alkyl, alkoxy, heterocyclic or heterocycloxy. Preferably, X1, R8 and R' are defined as above in relation to Formula II (note that R' is defined the same as L1 in formula II).

Warm Approach for Production

Prepolymers can be synthesized using monomers such as one or more of D,L-lactide, TMC, L-lactide, caproloactone, dioxanone, propylene glycol, ethylene glycol, 1,6 hexanediol, glycolide, 1,4-cyclohexane dimethanol, terephthaloyl chloride and bis(hydroxyethyl) terephthalate, for example, and other appropriate monomers, such as those disclosed in U.S. Pat. Nos. 5,952,451 and 6,008,318; and PCT publications WO 98/44020, WO 98/44021, and WO 98/48859. The monomers are preferably melted by heating to an appropriate temperature, such as 135° C. The monomer(s) can be polymerized to form the prepolymer using stannous catalysts, such as stannous octoate. Monomers and reaction proportions are selected depending upon the structure and properties desired in the final product.

The prepolymer then can be dissolved in an appropriate solvent, such as a halogenated organic solvent (for example, chloroform, dichloromethane, carbon tetrachloride and 1,2 dichloroethane). Other appropriate solvents include tetrahydofuiran, toluene, dimethoxyethane, N-methylpyrrolidone, dimethylsulfoxide, dimethylformamide, 2-butanone and acetone, for example. The solution containing the prepolymer also should contain one or more acid scavengers, such as TEA and DMAP, to remove acid generated by dehydrochlorination reactions, for example.

The prepolymer solution should then be chilled (for example, by ice bath), and then an organophosphorous compound is added to the solution. The organophosphorous compound can be selected from the group consisting of ethyl dichlorophosphate, ethyl dichlorophosphonate, hexyl dichlorophosphate and other appropriate organophosphorous compounds. The solution is then preferably warmed to an ambient temperature or above. Appropriate temperatures range from about 20° C. to 50° C. and any temperature therebetween, more preferably about 25° C. to 40° C., although temperatures outside of these ranges also can be employed in view of the present teachings.

Next, the solution is refluxed (and optionally heated) for up to 48 hours, during which time the phosphopolymer is formed. Optionally, the solution can then be concentrated to about ⅓ its original volume, and then refluxed further, preferably for about 16 hours at about 100° C. The temperature can then be raised, for example to about 115° C., and then permitted to cool.

The solution is then diluted with an appropriate solvent, such as a halogenated organic solvent (for example, methylene chloride). Next, the solution can be extracted with an HCl solution followed by extraction with an NaCl solution.

The organic layer containing the phosphopolymer then can be isolated, and then dried over sodium sulphate or magnesium sulphate, which later can be removed by filtration. The phosphopolymer in solution can then by concentrated, followed by precipitation. The phosphopolymer then can be dried under a vacuum.

Cold Approach for Production

Prepolymers can be synthesized using monomers such as one or more of D,L-lactide, TMC, L-lactide, caproloactone, dioxanone, propylene glycol, ethylene glycol, 1,6 hexanediol, glycolide, 1,4-cyclohexane dimethanol, terephthaloyl chloride and bis(hydroxyethyl) terephthalate, for example, and other appropriate monomers, such as those disclosed in U.S. Pat. Nos. 5,952,451 and 6,008,318; and PCT publications WO 98/44020, WO 98/44021, and WO 98/48859. The monomers are preferably melted by heating to an appropriate temperature, such as 135° C. The monomer (s) can be polymerized to form the prepolymer using stannous catalysts, such as stannous octoate. Monomers and reaction proportions are selected depending upon the structure and properties desired in the final product.

The prepolymer can then be dissolved in an appropriate solvent, such as a halogenated organic solvent (for example, chloroform, dichloromethane, carbon tetrachloride and 1,2 dichloroethane). Other appropriate solvents include tetrahydofuran, toluene, dimethoxyethane, N-methylpyrrolidone, dimethylsulfoxide, dimethylformamide, 2-butanone and acetone, for example. The solution containing the prepolymer also should contain on or more acid scavengers, such as TEA and DMAP, to remove acid generated by dehydrochlorination reactions, for example.

The prepolymer solution should then be chilled (for example, by ice bath or refrigeration), and then a solution of an organphosphorphous compound is added to the solution. The organophosphorous compound can be selected from the group consisting of ethyl dichlorophosphate, ethyl dichlorophosphonate, hexyl dichlorophosphate and other appropriate organophosphorous compounds. The reaction is maintained at a cold temperature, that is, below ambient temperature, such as at any temperature within the range of −15° C. to less than 20° C., preferably at a temperature range of −10° C. to 10° C., and more preferably at about 0° C. to 5° C., although temperatures outside of these ranges also can be appropriate in view of the present teachings. The reaction is allowed to continue until substantially all of the organophosphorous compound has bound with the prepolymer, preferably at least 80%, more preferably at least 90%, still more preferably at least 95%, yet more preferably at least 98%, and still more preferably at least 99% of the organophosphorous compound has bound with the prepolymer to form the phosphopolymer. By "substantially", as recognized by the skilled person, it is meant in this and similar contexts that the reaction yields a product that is sufficiently free of unbound reactants to be suitable for its intended purpose. Also as recognized by the skilled person, "bound" in its various grammatical forms refers to the formation of chemical bonds, including covalent bonds, ionic bounds, hydrogen bonds and Van der Waals forces.

Typically, the reaction should be run for any time interval within the range of about 0.5 to 18 hours, although reaction times outside of this range also can be appropriate.

Once the reaction has progressed to the desired point, such as when substantially all of the organophosphorous compound has bound with the prepolymer, the reaction can then be stopped/quenched with an alcohol, preferably an anhydrous alcohol such as anhydrous methanol. Next, the quenched solution can be contacted with acid and base ion exchange resins, as explained above, which preferably have been wetted in an appropriate organic solvent, such as chloroform, dichloromethane or an alcohol. The ion exchange resins are useful for removing contaminates, including but not limited to amines and metal contaminants, such as tin and zinc, resulting from the metal catalysts used in the formation of the polymers. The removal of metal contaminants is very desirable for polymers to be used in medical settings, particularly where there is to be long-term exposures to the polymer through, for example, dosing for chronic diseases and ailments.

After an appropriate contact period, such as any time interval within the range of about 1 to 20 hours or more, the ion exchange resins can be removed by appropriate techniques, such as filtration and/or sedimentation.

The organic layer containing the phosphopolymer then can be isolated. The phosphopolymer in solution can then be concentrated, followed by precipitation. The phosphopolymer then can be dried under a vacuum.

The cold approach has advantages over other approaches at least in terms of:

(1) fewer process steps (it can result in up to a three day time savings, for example);

(2) a capability to making polymers having higher and more homogeneous molecular weights;

(3) more consistent $T_g$ (glass transition temperature);

(4) increased control over reaction parameters and molecular weight of the final product;

(5) use of ion exchange resins and more efficient amine and metal removal results in higher purity and permits better scale-up as compared to other approaches, such as liquid extractions;

(6) higher yields;

(7) less energy consumption; and (8) less labor intensive.

The invention is further described by the following examples, which are illustrative of the various aspects of the invention but do not limit the invention in any way or manner.

EXAMPLE 6

All glassware was dried for a minimum of 2 hours at 105° C. and allowed to cool in a desiccator or cooled under a stream of argon gas. A 28.5 g portion of D,L-lactide and 1.5 g of 1,2 propanediol (molar ratio, 10:1) were weighed into a 250 mL 3-neck round bottom flask. The flask was equipped with a gas joint and a stirrer bearing/shaft/paddle assembly. The mixture was evacuated and pressurized with argon five times to remove residual air and moisture. The reaction apparatus was immersed in a preheated oil bath at 135° C., connected to an argon source with an oil bubbler, and stirred at a moderate speed until all of the solid monomer had melted.

At this time, a volume of stock stannous octoate solution (about 130 mg/ml in toluene of chloroform) equivalent to 3.6 mg tin (120 ppm stannous octoate or equivalent to 35 ppm tin based upon weight of the prepolymer) was added to the melt using a 50 µl syringe. The reaction mixture was allowed to stir under a slight argon pressure for approximately 16 hours. The oil bath temperature was then reduced to about 110° C. and the residual monomer was removed under vacuum. The upper parts of the reaction assembly were heated gently with a heat gun to aid in the monomer removal. The total time under vacuum was 2–3 hours. A reflux condenser was then inserted between the gas joint and the flask in the prepolymer apparatus described above. The molten prepolymer was dissolved by adding 100 mL of chloroform to the reaction flask with stirring.

Next, 6.9 mL of TEA and 1.21 g of DMAP were added to the stirring reaction mixture. The reaction mixture was then chilled to about 4° C. in an ice bath. A solution of approximately 2.5 mL of freshly distilled EOPCl$_2$ in 25 mL of chloroform was prepared in a dropping funnel. The solution in the funnel was added drop wise to the reaction mixture over a period of about 30 minutes. After the addition was complete the reaction mixture was allowed to continue stirring at about 4° C. for 10 minutes and then the ice bath was removed. The reaction mixture was allowed to warm to room temperature over about 1 hour. At this time a significant increase in viscosity of the clear solution was observed. The reaction mixture was then heated to reflux using an oil bath. Over the next hour the solution became cloudy. The reaction mixture was allowed to reflux over two nights, about 38 hours total.

At this time, a Barret trap was inserted between the condenser and the flask and 88 mL of solvent (⅔ of the total volume) were distilled from the reaction mixture. The Barret trap was removed and the reaction mixture was allowed to reflux for an additional 16 hours with the oil bath temperature between 98–102° C. Next, the oil bath temperature was increased to 115° C. for 2 hours. After this time, the reaction mixture was allowed to cool to room temperature, and 200 mL of dichloromethane was added and transferred to a separatory funnel. The reaction mixture was extracted twice with 100 mL of 0.1 M HCl and twice with 100 mL of saturated sodium chloride solution. The organic layer was isolated, dried overnight in the freezer at about −15° C. over 50 g of sodium sulfate, and filtered twice. The resulting polymer solution was poured into 1500 mL of hexane plus 500 mL of ether. The resulting mass of polymer was dried under vacuum. The Inherent Viscosity (IV) of this material was measure to be 0.39 dL/g.

EXAMPLE 7

A polyphoester was prepared from PG, D,L-lactide, and EOPCl$_2$ as follows:

All glassware was dried for a minimum of 2 hours at 105° C. and allowed to cool in a desiccator or cooled under a stream of argon gas. A 28.5 g portion of D,L-lactide and 1.5 g of PG (molar ratio, 10:1) were weighed into a 250 ml 3-neck round bottom flask. The flask was equipped with a gas joint and a stirrer bearing/shaft/paddle assembly. The mixture was evacuated and filled with argon five times to remove residual air and moisture. Each time the polymerization vessel was evacuated to a pressure between 0.5 and 10 torr. The reaction apparatus was immersed in a preheated oil bath at 125° C., connected to an argon source with an oil bubbler, and stirred at a moderate speed until all of the solid monomer had melted. At this time, a volume of stock stannous octoate solution (about 130 mg/ml in toluene) equivalent to 100 ppm stannous octoate (29 ppm Sn) was added to the melt using a syringe. The reaction mixture was allowed to stir under a slight argon pressure for 3 hours. The oil bath temperature was then reduced to about 105° C. and the residual monomer was removed under vacuum. The pressure was maintain as low as possible, typically between 0.5 and 10 torr. The upper parts of the reaction assembly were heated gently with a heat gun to aid in the monomer removal. The total time under vacuum was 1 hour.

The prepolymer was cooled to room temperature under argon gas and allowed to stand for 12–18 hours at ambient temperature. The prepolymer was dissolved in 84 ml of chloroform with stirring and 2.5 equivalents of TEA and 0.5 equivalents of DMAP were added to the stirring reaction mixture using a powder funnel. The reaction mixture was chilled to about −5° C. A solution of about 1 equivalent of distilled ethyl dichlorophosphate in 10 ml of chloroform was prepared in a dropping funnel. The solution in the funnel was added slowly to the reaction mixture over a period of 0.5 hour.

After the addition was complete, the reaction mixture was allowed to stir at low temperature for 1 hour at −5° C. The reaction was then quenched with 1 ml of anhydrous methanol and stirred for another five minutes. Next, the reaction mixture was transferred to a 0.5 gallon vessel and mixed with 37 g of Dowex DR-2030 and 30 g of Dowex M-43, and shaken on a mechanical shaker for 2 hour to remove residual DMAP and TEA free base and salts (the IERs had been washed with several bed volumes of methanol and chloroform and dried under vacuum at ambient temperature for about 18 hours). The resin was removed from the reaction mixture by vacuum filtration through Whatman 54 filter paper.

The resin was washed with about one bed volume of dichloromethane and the filtrate was concentrated to approximately 50 ml. The viscous filtrate was poured into 200 ml of petroleum ether to precipitate the polymer. The polymer mass was washed with 100 ml of petroleum ether and dried under vacuum. Molecular weights of the polymers were obtained from Gel Permeation Chromatography (GPC) using both differential refractive index detection and a polystyrene calibration curve (CC) and by light scattering detection. The molecular weight and IV data for the polymers prepared by this process are listed in the table below.

| Sample | Mw (LS), daltons | Mw (CC), daltons | IV, dL/g |
|---|---|---|---|
| 1 | 101,200 | 107,500 | 0.62 |
| 2 | 150,100 | 155,900 | 0.80 |
| 3 | 85,200 | 84,300 | — |
| 4 | 92,600 | 89,900 | — |

EXAMPLE 8

A 2000 g of portion D,L-Lactide and 100 g of propylene glycol were weighed into a 3000 ml 3-necked round bottom flask. The flask was equipped with a gas joint, a stirrer bearing/shaft/paddle assembly, and a Teflon-coated thermocouple. The flask was purged with nitrogen for 1 minute. The reaction apparatus was immersed in a preheated oil bath at 135° C. so that the oil level was at the bottom of the ground glass joints. The mixture was stirred until all of the solid monomer had melted and the internal temperature had reached 135° C. At this time, a volume of 10% solution of stannous octoate in toluene equivalent to 120 ppm (35 ppm Sn) was added to the melt using a syringe. Following a 1 minute nitrogen purge, the mixture was allowed to stir for a minimum of 16 hours. The oil bath was then reduced to 115° C.

When the internal (prepolymer mixture) temperature reached 115° C., the residual monomer was removed using vacuum for a minimum of 3 hours. A 2000 ml portion of chloroform was used to dissolve and transfer the prepolymer to a pre-chilled, 10 liter jacketed reactor, which contained 2.5 equivalents (based on propylene glycol) of triethylamine and 0.5 equivalents of 4-dimethylaminopyridine dissolved in 3600 ml of chloroform. The reactor was equipped with a stirrer bearing/shaft/turbine assembly, two gas joints, a tubing adapter, and a Teflon-coated thermocouple. With stirring and chilled recirculation on the jacket, the solution was cooled to below 5° C.

A solution of 1 equivalent (based on propylene glycol, approximately 215 g) of distilled ethyl dichlorophosphate in 645 ml chloroform was prepared in a 1000 ml 3-necked round bottom flask equipped with a tubing adapter and a gas joint. The EOPCl$_2$/chloroform solution was added using a piston pump and Teflon tubing over a period of 2 hours, maintaining the internal temperature at or below 5° C. Tubing was connected to the gas joints of the flask and reactor to equalize the pressure during the addition. Following the addition, a 50 ml portion of chloroform was added to rinse the flask, feed lines, and pump. The reaction mixture was stirred at low temperature (0–5° C.) for a minimum of 12 hours before the reaction was quenched with an addition of 140 ml of anhydrous methanol.

The reaction mixture was then diluted with the addition of 4-6 liters of chloroform. The reactor was then charged with 2 kg of a sulfonic acid strong cation exchange resin and 2 kg of a polyamine weak anion exchange resin. The polymer/resin mixture was mixed at low temperature for a minimum of 3 hours, after which it was transferred by vacuum to the stainless steel laboratory Nutsche filter. The polymer solution was pulled into the reservoir leaving the resin behind in the Nutsche. Approximately 2 liters of chloroform were added to wash the reactor before being pulled into the Nutsche, where the resin/solution were stirred for 15 minutes. The solution was then filtered into the reservoir.

The polymer solution was transferred back to the reactor with 1.5 kg of strong acid resin and 1 kg of weak base resin. The secondary polymer/resin mixture was mixed at low temperature for 12–18 hours. The filtration step was repeated using 1–2 liters of chloroform to rinse the reactor and resin. The polymer solution was pulled by vacuum through the pressure filter into the concentrator (a similar 10 liter jacketed reactor) where the solution was concentrated with the aid of heated recirculation on the jacket. After most of the chloroform had been removed, approximately 2–3 liters of a viscous solution remained. A portion of 3200 ml of ethyl ether was added to redissolve the polymer. After draining the polymer/ether mixture from the reactor, the polymer was precipitated in 30 liters of petroleum ether. The polymer was then spread out on a Teflon pan and placed in the vacuum oven for initial drying. After a minimum of 16 hours in the oven under vacuum, the polymer was ground into smaller pieces before being returned to the oven for a minimum of 24 hours.

had reached approximately 130° C. (oil bath was re-set for 130° C.).

At this time, a volume of solution of stannous octoate in toluene equivalent to approximately 200 ppm (about 60 ppm Sn) was added to the melt using a syringe. The mixture was allowed to stir for approximately 3 hours. The residual monomer was then removed using vacuum for approximately 1 hour. A 2000 ml portion of chloroform was used to dissolve and transfer the prepolymer to a pre-chilled, 10 liter jacketed reactor, which contained 2.5 equivalents (based on propylene glycol) of triethylamine and 0.5 equivalents of 4-dimethylaminopyridine dissolved in 3600 ml of chloroform. The reactor was equipped with a stirrer bearing/shaft/turbine assembly, two gas joints, a tubing adapter, and a Teflon-coated thermocouple. With stirring and chilled recirculation on the jacket, the solution was cooled to below −5° C.

A solution of 1 equivalent (based on propylene glycol, approximately 215 g) of distilled EOPCl$_2$ in 500 ml chloroform was prepared in a 1000 ml 3-necked round bottom flask equipped with a tubing adapter and a gas joint. The EOPCl$_2$/chloroform solution was added using a piston pump and Teflon tubing over a period of 1 hour, maintaining the internal temperature at or below 0° C. Tubing was connected to the gas joints of the flask and reactor to equalize the pressure during the addition. Following the addition, a 50 ml portion of chloroform was added to rinse the flask, feed lines, and pump. The reaction mixture was stirred for 1 hour at low temperature (−5° C. after 1 hour) before the reaction was quenched with 140 ml of anhydrous methanol. One-quarter of the reaction mixture was then removed to perform a separate experiment.

The main cut was transferred to a 20 liter jacketed reactor containing 2.5 kg of a sulfonic acid strong cation exchange resin and 2.5 kg of a polyamine weak anion exchange resin, wetted with approximately 5 liters of chloroform. The polymer/resin mixture was mixed at low temperature for 14 hours, after which it was transferred to the stainless steel laboratory Nutsche filter. The polymer solution was then filtered into the reservoir. The reactor was washed with 1 liter of chloroform, which was transferred to the Nutsche. A portion of the polymer solution was pulled through the pressure filter into the concentrator (a similar 10 liter jacketed reactor). Approximately 4 liters of chloroform were added to the Nutsche, and its contents were mixed for 30 minutes.

After 30 minutes, the remaining solution was transferred to the concentrator where the solution was concentrated with

| sample | Yield % | composition PG:La:EOP | Mw (LS) daltons | Tg ° C. | Residual TEA % | Residual DMAP, % | Residual Sn, ppm |
|---|---|---|---|---|---|---|---|
| 1 | 81 | 1:10:1.0 | 41,000 | 42 | <0.01 | 0.4 | 18 |
| 2 | 84 | 1:11:1.0 | 37,000 | 41 | <0.01 | 0.4 | 14 |

EXAMPLE 9

A 2000 g portion of D,L-Lactide and 100 g portion of propylene glycol were weighed into a 3000 ml 3-necked round bottom flask. The flask was equipped with a gas joint, a stirrer bearing/shaft/paddle assembly, and a Teflon-coated thermocouple. The flask was purged with nitrogen for 1 minute. The reaction apparatus was immersed in a preheated oil bath at 135° C. so that the oil level was at the bottom of the ground glass joints. The mixture was stirred until all of the solid monomer had melted and the internal temperature the aid of heated recirculation on the jacket. After most of the chloroform had been removed, approximately 2 liters of a viscous solution remained. A portion of 2400 ml of ethyl ether was then added to redissolve the polymer. After draining the polymer/ether mixture from the reactor, the polymer was precipitated in 25 liters of petroleum ether. The polymer was then spread out on a Teflon pan and placed in the vacuum oven at ambient temperature. After the initial drying under vacuum, the polymer was ground into smaller pieces before being returned to the oven.

| sample | yield % | composition PG:La:EOP | Mw (LS) daltons | Tg °C. | Residual TEA % | Residual DMAP % | Residual Sn ppm |
|---|---|---|---|---|---|---|---|
| 1 | 71 | 1:10:09 | 32,000 | 40 | 0.1 | 0.05 | 8 |

EXAMPLE 10

A 100 g portion of propylene glycol was weighed into a 3000 ml 3-necked round bottom flask. The flask was equipped with a gas joint, a stirrer bearing/shaft/paddle assembly, and a Teflon-coated thermocouple. The reaction apparatus was partially immersed in a preheated oil bath at 135° C. and purged with nitrogen for one minute. A 2000 g portion of D,L-Lactide was added incrementally over period of approximately 1 hour. The reaction apparatus was then immersed in the oil so that the oil level was at the bottom of the ground glass joints. The mixture was stirred until all of the solid monomer had melted and the internal temperature had reached approximately 130° C.

At this time, a volume of solution of stannous octoate in toluene equivalent to approximately 2000 ppm (about 600 ppm Sn) was added to the melt using a syringe. The mixture was allowed to stir for approximately 16 hours. The residual monomer was then removed using vacuum for approximately 1 hour. A 2000 ml portion of chloroform was used to dissolve and transfer the prepolymer to a pre-chilled, 10 liter jacketed reactor, which contained 2.5 equivalents (based on propylene glycol) of triethylamine and 0.5 equivalents of 4-dimethylaminopyridine dissolved in 3600 ml of chloroform. The reactor was equipped with a stirrer bearing/shaft/turbine assembly, two gas joints, a tubing adapter, and a Teflon-coated thermocouple.

With stirring and chilled recirculation on the jacket, the solution was cooled to below −15° C. A solution of 1 equivalent (based on propylene glycol, approximately 215 g) of distilled EOPCl$_2$ in 500 ml chloroform was prepared in a 1000 ml 3-necked round bottom flask equipped with a tubing adapter and a gas joint. The EOPCl$_2$/chloroform solution was added using a piston pump and Teflon tubing over a period of 1 hour, maintaining the internal temperature at approximately −5° C. Tubing was connected to the gas joints of the flask and reactor to equalize the pressure during the addition.

Following the addition, a 50 ml portion of chloroform was added to rinse the flask, feed lines, and pump. The reaction mixture was stirred for 1 hour at low temperature (−15° C. after 1 hour) before the reaction was quenched with an addition of 140 ml of anhydrous methanol. The reaction mixture was then diluted with approximately 5 liters of chloroform and transferred to a 20 liter jacketed reactor. The reactor was then charged with 3 kg of a sulfonic acid strong cation exchange resin and 3 kg of a polyamine weak anion exchange resin. The polymer/resin mixture was mixed at low temperature for 20 hours, after which it was transferred by vacuum to the stainless steel laboratory Nutsche filter. With the resin being filtered off in the Nutsche, the polymer solution was pulled through the pressure filter into the concentrator (a similar 10 liter jacketed reactor) where the solution was concentrated with the aid of heated recirculation on the jacket.

The 20 liter reactor and the resin in Nutsche were washed with 4 liters of chloroform, which were subsequently transferred to the concentrator. After most of the chloroform had been removed, approximately 2–3 liters of a viscous solution remained. The polymer was left under vacuum at ambient temperature for 16 hours. Approximately 1.5 liters of methylene chloride were then added to redissolve the mostly solid polymer. A portion of 3200 ml of ethyl ether was then added to the polymer solution. The mixture was mixed until homogenous and split into two equal cuts.

The first cut (1) was poured into a Teflon pan and placed in the vacuum oven at ambient temperature. The second cut (2) was precipitated in 25 liters of petroleum ether. The polymer was then spread out on a Teflon pan and placed in the vacuum oven at ambient temperature. After approximately 1.5 weeks in the oven under vacuum, the polymer was ground into smaller pieces before being returned to the oven for approximately 2 days.

| sample | Yield % | composition PG:La:EOP | Mw (LS) daltons | Tg °C. | Residual TEA % | Residual DMAP, % | Residual Sn, ppm |
|---|---|---|---|---|---|---|---|
| 1 | 55 | 1:10:1.0 | 59,000 | 37 | N.D. | 0.12 | 36 |
| 2 | 102 | 1:10:1.0 | 56,000 | 43 | <0.01 | 0.13 | 37 |

Note:
Total % Yield (both cuts): 78.5%

EXAMPLE 11

A 100 g portion of propylene glycol was weighed into a 3000 ml 3-necked round bottom flask. The flask was equipped with a gas joint, a stirrer bearing/shaft/paddle assembly, and a Teflon-coated thermocouple. The reaction apparatus was placed in a preheated oil bath at 130° C. and purged with nitrogen for one minute. A 2000 g portion of D,L-Lactide was added using a powder addition funnel over a period of 45 minutes. The reaction apparatus was then immersed in the oil so that the oil level was at the bottom of the ground glass joints. The mixture was stirred until all of the solid monomer had melted and the internal temperature had reached approximately 125° C.

At this time, a volume of solution of stannous octoate in chloroform equivalent to approximately 400 ppm (about 117 ppm Sn) was added to the melt using a syringe. The mixture was allowed to stir for approximately 16 hours (the oil set point was decreased to approximately 125° C. The residual monomer was then removed using vacuum for approximately 1 hour. A 2500 ml portion of chloroform was used to dissolve and transfer the prepolymer to a pre-chilled, 20 liter jacketed reactor, which contained 2.5 equivalents (based on propylene glycol) of triethylamine and 0.5 equivalents of 4-dimethylaminopyridine dissolved in 3600 ml of chloroform. The reactor was equipped with a stirrer bearing/shaft/turbine assembly, a gas joint, a tubing adapter, and a Teflon-coated thermocouple.

With stirring and chilled recirculation on the jacket, the solution was cooled to below −15° C. A solution of 1 equivalent (based on propylene glycol, approximately 215 g) of distilled $EOPCl_2$ in 650 ml chloroform was prepared in a 1000 ml 3-necked round bottom flask equipped with a tubing adapter and a gas joint. The $EOPCl_2$/chloroform solution was added using a piston pump and Teflon tubing over a period of 50 minutes, maintaining the internal temperature at approximately −10° C. Tubing was connected to the gas joints of the flask and reactor to equalize the pressure during the addition. Following the addition, a 50 ml portion of chloroform was added to rinse the flask, feed lines, and pump. The reaction mixture was stirred for 1 hour at low temperature (−8° C. after 1 hour) before the reaction was quenched with 140 ml of anhydrous methanol.

The reactor was then charged with 3 kg of a sulfonic acid strong cation exchange resin and 3 kg of a polyamine weak anion exchange resin wetted with approximately 6.5 liters of methylene chloride. The polymer/resin mixture was mixed at low temperature for 15 hours, after which it was transferred by vacuum to the stainless steel laboratory Nutsche filter. With the resin being filtered off in the Nutsche, the polymer solution was pulled through the in-line cartridge filter into the concentrator (a similar 10 liter jacketed reactor) where the solution was concentrated with the aid of heated recirculating fluid on the jacket.

The 20 liter reactor and the resin in Nutsche were washed with 5 liters of methylene chloride, which were transferred to the concentrator after being stirred for 1 hour. An additional 5 liters of methylene chloride were added to the resin in the Nutsche and added to the concentrator when the solution had been reduced down to approximately 6 liters. Concentration of the polymer solution continued until approximately 4–5 liters of a viscous solution remained. A portion of 1500 ml of ethyl acetate was then added to the polymer solution.

The mixture was mixed until homogenous and precipitated in approximately 10 liters of petroleum ether. After the precipitation mixture was stirred for approximately 5 minutes, the supernatant liquid was decanted. The polymer was then washed with S liters of petroleum ether. After the mixture was stirred for 5 minutes. The liquid was again decanted. The polymer was poured into a Teflon-coated pan and placed in the vacuum oven at ambient temperature. After drying for 3 days, the polymer was ground into smaller pieces.

EXAMPLE 12

A phosphopolymer was prepared from 1,2 propanediol, PG, D,L-lactide, and ethyl dichlorophosphate ($EOPCl_2$) as follows:

All glassware was dried for a minimum of 2 hours at 105° C. and allowed to cool in a desiccator or cooled under a stream of argon gas. A 28.5 g portion of D,L-lactide and 1.5 g of PG (molar ratio, 10:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 135° C., connected to an argon source with an oil bubbler, and stirred at a moderate speed until all of the solid monomer had melted.

At this time, a volume of stock stannous octoate solution (about 130 mg/ml in toluene) equivalent to 3.6 mg time (120 ppm stannous octoate, equivalent to 35 ppm tin) was added to the melt using a 50 $\mu$l syringe. The reaction mixture was allowed to stir under a slight argon pressure for approximately 16 hours. The oil bath temperature was then reduced to about 110° C. and the residual monomer was removed under vacuum. The upper parts of the reaction assembly were heated gently with a heat gun to aid in the monomer removal. The total time under vacuum was 2–3 hours.

The molten prepolymer was dissolved in 100 ml of chloroform with stirring and 2.5 equivalents of TEA and equivalents of DMAP were added to the stirring reaction mixture using a powder funnel. The funnel was rinsed with 10 ml of chloroform. The reaction mixture was chilled to about 4° C. in a cold bath A solution of about 1 equivalent of distilled $EOPCl_2$ in 27.5 ml of chloroform was prepared in a dropping funnel. The solution in the funnel was added slowly to the reaction mixture over a period of 1 hour.

After the addition was complete, the reaction mixture was allowed to stir at low temperature for another hour and then the cold bath was removed. The reaction mixture was allowed to warm to room temperature and stirred for 2 to 18 hours. After 2 hours a significant increase in viscosity of the clear solution was observed. The reaction was then quenched with 800 $\mu$l of anhydrous methanol and stirred for another five minutes.

Next, Dowex MR-3C ion exchange resin (IER) was added to the reaction mixture and stirring was continued for another hour to remove residual DMAP and TEA free base and salts (the Dowex resin had been washed with several bed volumes of methanol and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 100 ml. The viscous filtrate (now a somewhat cloudy solution) was poured into 1000 ml of hexane to precipitate the polymer. The polymer mass was washed with 2×200 ml of hexane and dried under vacuum. The resulting polymer was dissolved in 50 mL of dichloromethane and precipitated into 1 L of methanol and dried under vacuum.

| sample | yield % | composition PG:La:EOP | Mw (LS) daltons | Tg ° C. | Residual TEA % | Residual DMAP, % | Residual Sn ppm |
|---|---|---|---|---|---|---|---|
| 1 | 82 | 1:10:0.9 | 62,000 | | N.D. | 0.14 | 4 |

The yield of dried polymer was 17.9 g. The weight-average molecular weight for the polymer obtained using a differential refractive index detector and a polystyrene calibration curve (Mw CC) was 61,900 daltons. The weight-average Mw for the polymer obtained using a light scattering detector (Mw LS) was 131,800 daltons. The values for inherent viscosity (IV) was 0.77 dL/g. The $^1$H and $^{31}$P {$^1$H} NMR spectra of this polymer are consistent with the presumed structure.

EXAMPLE 13

A phosphopolymer was prepared from propylene glycol, D,L-lactide, and EOPCl$_2$ as follows:

All glassware was dried for a minimum of 2 hours at 105° C. and allowed to cool in a desiccator or cooled under a stream of argon gas. A 100.0 g portion of D,L-lactide and 5.3 g of PG (molar ratio, 10:1) were weighed into a 1000 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 135° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for approximately 16 hours. The oil bath temperature was then reduced to about 110° C. and the residual monomer was removed under vacuum. The upper parts of the reaction assembly were heated gently with a heat gun to aid in the monomer removal. The total time under vacuum was 2–3 hours.

The molten prepolymer was dissolved in 350 ml of chloroform with stirring and equivalents of TEA and equivalents of DMAP were added to the stirring reaction mixture using a powder funnel. The reaction mixture was chilled to about −5° C. A solution of about 1 equivalent of distilled EOPCl$_2$ in 97 ml of chloroform was prepared in a dropping funnel. The solution in the funnel was added slowly to the reaction mixture over a period of 2 hours. After the addition was complete, the reaction mixture was allowed to stir at low temperature for 45 minutes at −5° C. After 2 hours a significant increase in viscosity of the clear solution was observed. The reaction was then quenched with 6.8 ml of anhydrous methanol and stirred for another five minutes.

Next, the reaction mixture was transferred to a 0.5 gallon vessel and mixed with 87 g of Dowex HCR-S and 104 g of Dowex M-43, and shaken on a mechanical shaker for 1 hour to remove residual DMAP and TEA free base and salts (the IERs had been washed with several bed volumes of methanol and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 150 ml. The viscous filtrate was poured into 2000 ml of hexane to precipitate the polymer. The polymer mass was washed with 2×200 ml of hexane and dried under vacuum. The molecular weights were determined by GPC were 39,000 for Mw (LS) and 35,300 for Mw (CC). The value for IV was 0.30 dL/g.

EXAMPLE 14

A phosphopolymer was prepared from ethylene glycol (EG), D,L-lactide, and ethyl dichlorophosphate as follows:

All glassware was dried for a minimum of 2 hours at 105° C. and allowed to cool in a desiccator or cooled under a stream of argon gas. A 100.0 g portion of D,L-lactide and 4.3 g of EG (molar ratio, 10:1) were weighed into a 1000 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 135° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for approximately 16 hours. The oil bath temperature was then reduced to about 110° C. and the residual monomer was removed under vacuum. The upper parts of the reaction assembly were heated gently with a heat gun to aid in the monomer removal. The total time under vacuum was 2–3 hours.

The molten prepolymer was dissolved in 350 ml of chloroform with stirring and equivalents of TEA and equivalents of DMAP were added to the stirring reaction mixture using a powder funnel. The reaction mixture was chilled to about −5° C. A solution of about 1 equivalent of distilled ethyl dichlorophosphate in 97 ml of chloroform was prepared in a dropping funnel. The solution in the funnel was added slowly to the reaction mixture over a period of 2 hours. After the addition was complete, the reaction mixture was allowed to stir at low temperature for 45 minutes at −5° C. After 2 hours a significant increase in viscosity of the clear solution was observed. The reaction was then quenched with 6.8 ml of anhydrous methanol and stirred for another five minutes.

Next, the reaction mixture was transferred to a 0.5 gallon vessel and mixed with 87 g of Dowex HCR-S and 104 g of Dowex M-43, and shaken on a mechanical shaker for 1 hour to remove residual DMAP and TEA free base and salts (the IERs had been washed with several bed volumes of methanol and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 150 ml. The viscous filtrate was poured into 2000 ml of hexane to precipitate the polymer. The polymer mass was washed with 2×200 ml of hexane and dried under vacuum. The molecular weights were determined by GPC were 40,400 for Mw (LS) and 42,000 for Mw (CC).

EXAMPLE 15

A phosphopolymer was prepared from 1,6 hexanediol (HD), D,L-lactide, and ethyl dichlorophosphate (EOPCl$_2$) as follows:

All glassware was dried for a minimum of 2 hours at 105° C. and allowed to cool in a desiccator or cooled under a stream of argon gas. A 100.0 g portion of D,L-lactide and 8.2 g of HD (molar ratio, 10:1) were weighed into a 1000 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 135° C., connected to an argon source with an oil bubbler, and stirred at a moderate speed until all of the solid monomer had melted.

At this time, a volume of stock stannous octoate solution equivalent (about 130 mg/ml in toluene) to 120 ppm stannous octoate or 35 ppm Sn was added to the melt using a syringe. The reaction mixture was allowed to stir under a slight argon pressure for approximately 16 hours. The oil bath temperature was then reduced to about 110° C. and the residual monomer was removed under vacuum. The upper parts of the reaction assembly were heated gently with a heat gun to aid in the monomer removal. The total time under vacuum was 2–3 hours.

The molten prepolymer was dissolved in 350 ml of chloroform with stirring and equivalents of TEA and equivalents of DMAP were added to the stirring reaction mixture using a powder funnel. The reaction mixture was chilled to about −5° C. A solution of about 1 equivalent of distilled ethyl dichlorophosphate (EOPCl$_2$) in 97 ml of chloroform was prepared in a dropping funnel. The solution in the funnel was added slowly to the reaction mixture over a period of 2 hours. After the addition was complete, the reaction mixture was allowed to stir at low temperature for 45 minutes at −5° C. After 2 hours a significant increase in viscosity of the clear solution was observed. The reaction was then quenched with 6.8 ml of anhydrous methanol and stirred for another five minutes.

Next, the reaction mixture was transferred to a 0.5 gallon vessel and mixed with 87 g of Dowex HCR-S and 104 g of Dowex M-43, and shaken on a mechanical shaker for 1 hour to remove residual DMAP and TEA free base and salts (the IERs had been washed with several bed volumes of methanol and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 150 ml. The viscous filtrate was poured into 2000 ml of hexane to precipitate the polymer. The polymer mass was washed with 2×200 ml of hexane and dried under vacuum. The molecular weights were determined by GPC were 36,700 for Mw (LS) and 34,100 for Mw (CC). The value for IV was 0.33 dL/g.

EXAMPLE 16

A polyphosphoester was prepared from propylene glycol, D,L-lactide, and EOPCl$_2$ as follows:

All glassware was dried for a minimum of 2 hours at 105° C. and allowed to cool in a desiccator or cooled under a stream of argon gas. A 28.5 g portion of D,L-lactide and 1.5 g of PG (molar ratio, 10:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 130° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for approximately 16 to 18 hours. The oil bath temperature was then reduced to about 115° C. and the residual monomer was removed under vacuum. The upper parts of the reaction assembly were heated gently with a heat gun to aid in the monomer removal. The total time under vacuum was 2 hours.

The prepolymer was dissolved in 84 ml of chloroform with stirring and 2.5 equivalents of TEA and 0.5 equivalents of DMAP were added to the stirring reaction mixture using a powder funnel. The reaction mixture was chilled to about −5° C. A solution of about 1 equivalent of distilled EOPCl$_2$ in 10 ml of chloroform was prepared in a dropping funnel. The solution in the funnel was added slowly to the reaction mixture over a period of 0.5 hour. After the addition was complete, the reaction mixture was allowed to stir at low temperature for 1 hour at −5° C. The reaction was then quenched with 1 ml of anhydrous methanol and stirred for another five minutes.

Next, the reaction mixture was transferred to a 0.5 gallon vessel and mixed with 37 g of Dowex DR-2030 and 30 g of Dowex M-43, and shaken on a mechanical shaker for 2 hour to remove residual DMAP and TEA free base and salts (the EERs had been washed with several bed volumes of methanol and chloroform and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 50 ml. The viscous filtrate was poured into 200 ml of petroleum ether to precipitate the polymer. The polymer mass was washed with 100 ml of petroleum ether and dried under vacuum. The molecular weight data for the polymers prepared by this process are listed in the table below.

| Sample | Mw (LS), daltons | Mw (CC), daltons |
|---|---|---|
| 1 | 67,300 | 72,600 |
| 2 | 65,400 | 72,900 |
| 3 | 62,800 | 72,600 |

EXAMPLE 17

A phosphopolymer was prepared from propylene glycol, D,L-lactide, and EOPCl$_2$ as follows:

All glassware was dried for a minimum of 2 hours at 105° C. and allowed to cool in a desiccator or cooled under a stream of argon gas. A 28.5 g portion of D,L-lactide and 3.0 g of PG (molar ratio, 5:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 145° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for approximately 16 hours. The oil bath temperature was then reduced to about 115° C. and the residual monomer was removed under vacuum. The upper parts of the reaction assembly were heated gently with a heat gun to aid in the monomer removal. The total time under vacuum was 2 hours.

The prepolymer was dissolved in 88 ml of chloroform with stirring and 2.5 equivalents of TEA and 0.5 equivalents of DMAP were added to the stirring reaction mixture using a powder funnel. The reaction mixture was chilled to about −5° C. A solution of about 1 equivalent based on PG (6.5 g) of distilled ethyl dichlorophosphate (EOPCl$_2$) in 20 ml of chloroform was prepared in a dropping funnel. The solution in the funnel was added slowly to the reaction mixture over a period of 0.5 hour. After the addition was complete, the reaction mixture was allowed to stir at low temperature for 1 hour at −5° C. The reaction was then quenched with 1 ml of anhydrous methanol and stirred for another five minutes.

Next, the reaction mixture was transferred to a 0.5 gallon vessel and mixed with 74 g of Dowex DR-2030 and 59 g of Dowex M-43, and shaken on a mechanical shaker for 2 hour to remove residual DMAP and TEA free base and salts (the IERs had been washed with several bed volumes of methanol and chloroform and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 50 ml. The viscous filtrate was poured into 200 ml of petroleum ether to precipitate the polymer. The polymer mass was washed with 100 ml of petroleum ether and dried under vacuum. The molecular weights were determined by GPC were 49,500 for Mw (LS) and 49,600 for Mw (CC). The value for IV was 0.46 dL/g.

EXAMPLE 18

A phosphopolymer was prepared from propylene glycol, D,L-lactide, and ethyl dichlorophosphate as follows:

All glassware was dried for a minimum of 2 hours at 105° C. and allowed to cool in a desiccator or cooled under a stream of argon gas. A 28.5 g portion of D,L-lactide and 1.0 g of PG (molar ratio, 15:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 145° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for approximately 16 hours. The oil bath temperature was then reduced to about 115° C. and the residual monomer was removed under vacuum. The upper parts of the reaction assembly were heated gently with a heat gun to aid in the monomer removal. The total time under vacuum was 2 hours.

The prepolymer was dissolved in 83 ml of chloroform with stirring and 2.5 equivalents of TEA and 0.5 equivalents of DMAP were added to the stirring reaction mixture using a powder funnel. The reaction mixture was chilled to about −5° C. A solution of about 1 equivalent based on PG (2.2 g) of distilled ethyl dichlorophosphate (EOPCl$_2$) in 7 ml of chloroform was prepared in a dropping funnel. The solution in the funnel was added slowly to the reaction mixture over a period of 0.5 hour. After the addition was complete, the reaction mixture was allowed to stir at low temperature for 1 hour at −5° C. The reaction was then quenched with 1 ml of anhydrous methanol and stirred for another five minutes.

Next, the reaction mixture was transferred to a 0.5 gallon vessel and mixed with 25 g of Dowex DR-2030 and 20 g of Dowex M-43, and shaken on a mechanical shaker for 2 hour to remove residual DMAP and TEA free base and salts (the IERs had been washed with several bed volumes of methanol and chloroform and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 50 ml. The viscous filtrate was poured into 200 ml of petroleum ether to precipitate the polymer. The polymer mass was washed with 100 ml of petroleum ether and dried under vacuum. The molecular weights were determined by GPC were 36,900 for Mw (LS) and 39,400 for Mw (CC). The value for IV was 0.37 dL/g.

EXAMPLE 19

A polyphosphoester was prepared from propylene glycol, D,L-lactide, and ethyl dichlorophosphate as follows:

All glassware was dried for a minimum of 2 hours at 105° C. and allowed to cool in a desiccator or cooled under a stream of argon gas. A 28.5 g portion of D,L-lactide and 0.75 g of PG (molar ratio, 20:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 145° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for approximately 16 hours. The oil bath temperature was then reduced to about 115° C. and the residual monomer was removed under vacuum. The upper parts of the reaction assembly were heated gently with a heat gun to aid in the monomer removal. The total time under vacuum was 2 hours.

The prepolymer was dissolved in 82 ml of chloroform with stirring and 2.5 equivalents of TEA and 0.5 equivalents of DMAP were added to the stirring reaction mixture using a powder funnel. The reaction mixture was chilled to about −5° C. A solution of about 1 equivalent based on PG (1.6 g) of distilled ethyl dichlorophosphate in 5 ml of chloroform was prepared in a dropping funnel. The solution in the funnel was added slowly to the reaction mixture over a period of 0.5 hour. After the addition was complete, the reaction mixture was allowed to stir at low temperature for 1 hour at −5° C. The reaction was then quenched with 1 ml of anhydrous methanol and stirred for another five minutes.

Next, the reaction mixture was transferred to a 0.5 gallon vessel and mixed with 19 g of Dowex DR-2030 and 15 g of Dowex M-43, and shaken on a mechanical shaker for 2 hour to remove residual DMAP and TEA free base and salts (the IERs had been washed with several bed volumes of methanol and chloroform and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 50 ml. The viscous filtrate was poured into 200 ml of petroleum ether to precipitate the polymer. The polymer mass was washed with 100 ml of petroleum ether and dried under vacuum. The molecular weights were determined by GPC were 47,100 for Mw (LS) and 53,000 for Mw (CC). The value for IV was 0.44 dL/g.

EXAMPLE 20

A was prepared from propylene glycol, D,L-lactide, and EOPCl$_2$ as follows:

All glassware was dried for a minimum of 2 hours at 105° C. and allowed to cool in a desiccator or cooled under a stream of argon gas. A 28.5 g portion of D,L-lactide and 0.4 g of PG (molar ratio, 40:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 145° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for approximately 16 hours. The oil bath temperature was then reduced to about 115° C. and the residual monomer was removed under vacuum. The upper parts of the reaction assembly were heated gently with a heat gun to aid in the monomer removal. The total time under vacuum was 2 hours.

The prepolymer was dissolved in 81 ml of chloroform with stirring and 2.5 equivalents of TEA and 0.5 equivalents of DMAP were added to the stirring reaction mixture using a powder funnel. The reaction mixture was chilled to about −5° C. A solution of about 1 equivalent based on PG (0.8 g) of distilled ethyl dichlorophosphate ($EOPCl_2$) in 2 ml of chloroform was prepared in a dropping funnel. The solution in the funnel was added slowly to the reaction mixture over a period of 0.5 hour. After the addition was complete, the reaction mixture was allowed to stir at low temperature for 1 hour at −5° C. The reaction was then quenched with 1 ml of anhydrous methanol and stirred for another five minutes.

Next, the reaction mixture was transferred to a 0.5 gallon vessel and mixed with 9 g of Dowex DR-2030 and 7 g of Dowex M-43, and shaken on a mechanical shaker for 2 hour to remove residual DMAP and TEA free base and salts (the EERs had been washed with several bed volumes of methanol and chloroform and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 50 ml. The viscous filtrate was poured into 200 ml of petroleum ether to precipitate the polymer. The polymer mass was washed with 100 ml of petroleum ether and dried under vacuum. The molecular weights were determined by GPC were 12,200 for Mw (LS) and 14,800 for Mw (CC). The value for IV was 0.19 dL/g.

EXAMPLE 21

A was prepared from propylene glycol, D,L-lactide, glycolide, and ethyl dichlorophosphate as follows:

All glassware was dried for a minimum of 2 hours at 105° C. and allowed to cool in a desiccator or cooled under a stream of argon gas. A 28.5 g portion of D,L-lactide and 1.5 g of PG (molar ratio, 10:1) were weighed into a 250 ml 3-neck round bottom flask. The flask was equipped with a gas joint and a stirrer bearing/shaft/paddle assembly and a 125 ml dropping funnel containing 4.6 g of glycolide. The mixture was evacuated and filled with argon five times to remove residual air and moisture. The reaction apparatus was immersed in a preheated oil bath at 135° C., connected to an argon source with an oil bubbler, and stirred at a moderate speed until all of the solid monomer had melted.

At this time, a volume of stock stannous octoate solution (about 130 mg/ml in toluene) equivalent to 3.6 mg tin (120 ppm stannous octoate or 35 ppm tin) was added to the melt using a 50 µl syringe. The reaction mixture was allowed to stir under a slight argon pressure for approximately 16 hours. At this time the glycolide was melted using a heat gun and added to the polymer melt in the flask. The melt was stirred for an additional 2 hours. The oil bath temperature was then reduced to about 115° C. and the residual monomer was removed under vacuum. The upper parts of the reaction assembly were heated gently with a heat gun to aid in the monomer removal. The total time under vacuum was 2 hours.

The molten prepolymer was suspended in 84 ml of chloroform with stirring and 2. 5 equivalents of TEA and equivalents of DMAP were added to the stirring reaction mixture using a powder funnel. The reaction mixture was chilled to about 4° C. in a cold bath. A solution of about 1 equivalent of distilled $EOPCl_2$ in 27.5 ml of chloroform was prepared in a dropping funnel. The solution in the funnel was added slowly to the reaction mixture over a period of 1 hour. After the addition was complete, the reaction mixture was allowed to stir at low temperature for another 1.75 hours and then the cold bath was removed. The reaction mixture was allowed to warm to room temperature and stirred for 2 to 18 hours. After 2 hours a significant increase in viscosity of the clear solution was observed. The reaction was then quenched with 1 ml of anhydrous methanol and stirred for another five minutes.

Next, 37 g of dry Dowex HCR-S and 30 g of dry Dowex M-43 were added to the reaction mixture and stirring was continued for another hour to remove residual DMAP and TEA free base and salts. The IERs were removed from the reaction mixture by vacuum filtration through Whatman 54 filter paper. The resin was washed with about one bed volume of dichloromethane and the filtrate was concentrated to approximately 50 ml. The viscous filtrate was poured into 700 ml of petroleum ether to precipitate the polymer and dried under vacuum. The molecular weights determined by GPC were 12,900 for Mw (LS) and 14,300 for Mw (CC). The value for IV was 0.11 dL/g.

EXAMPLE 22

A was prepared from propylene glycol, D,L-lactide, and hexyl dichlorophosphate ($HOPCl_2$) as follows:

All glassware was dried for a minimum of 2 hours at 105° C. and allowed to cool in a desiccator or cooled under a stream of argon gas. A 28.5 g portion of D,L-lactide and 1.5 g of PG (molar ratio, 10:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 135° C., connected to an argon source with an oil bubbler, and stirred at a moderate speed until all of the solid monomer had melted.

At this time, a volume of stock stannous octoate solution (about 130 mg/ml in toluene) equivalent to 3.6 mg tin (120 ppm stannous octoate or 35 ppm tin) was added to the melt using a 50 µl syringe. The reaction mixture was allowed to stir under a slight argon pressure for approximately 16 hours. The oil bath temperature was then reduced to about 110° C. and the residual monomer was removed under vacuum. The upper parts of the reaction assembly were heated gently with a heat gun to aid in the monomer removal. The total time under vacuum was 2–3 hours.

The molten prepolymer was dissolved in 100 ml of chloroform with stirring and TEA and DMAP were added to the stirring reaction mixture using a powder funnel. The funnel was rinsed with 10 ml of chloroform. The reaction mixture was chilled to about 4° C. in a cold bath. A solution of about 1 equivalent of distilled $HOPCl_2$ in 27.5 ml of chloroform was prepared in a dropping funnel. The solution in the funnel was added slowly to the reaction mixture over a period of 1 hour. After the addition was complete, the reaction mixture was allowed to stir at low temperature for another hour and then the cold bath was removed. The reaction mixture was allowed to warm to room temperature and stirred for 2 to 18 hours. After 2 hours a significant increase in viscosity of the clear solution was observed. The reaction was then quenched with 800 gl of anhydrous methanol and stirred for another five minutes.

Next, Dowex MR-3C ion exchange resin was added to the reaction mixture and stirring was continued for another hour to remove residual DMAP and TEA free base and salts (the Dowex resin had been washed with several bed volumes of methanol and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 100 ml. The viscous filtrate (now a somewhat cloudy solution) was poured into 1000 ml of hexane to precipitate the polymer. The polymer mass was washed with 2×200 ml of hexane and dried under vacuum. The molecular weight and IV data for the polymers prepared by this process are listed in the table below.

| Sample | Mw (LS), daltons | Mw (CC), daltons | IV, dL/g |
|---|---|---|---|
| 1 | 64,200 | 58,000 | 0.48 |
| 2 | 68,000 | 62,700 | 0.43 |

EXAMPLE 23

A was prepared from propylene glycol, D,L-lactide, and ethyl dichlorophosphonate ($EPCl_2$) as follows:

All glassware was dried for a minimum of 2 hours at 105° C. and allowed to cool in a desiccator or cooled under a stream of argon gas. A 28.5 g portion of D,L-lactide and 1.5 g of PG (molar ratio, 10:1) were weighed into a 250 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 130° C., connected to an argon source with an oil bubbler, and stirred at a moderate speed until all of the solid monomer had melted.

At this time, a volume of stock stannous octoate solution (about 130 mg/ml in toluene) equivalent to 120 ppm stannous octoate or 35 ppm Sn was added to the melt using a syringe. The reaction mixture was allowed to stir under a slight argon pressure for 4 hours. The oil bath temperature was then reduced to about 110° C. and the residual monomer was removed under vacuum. The upper parts of the reaction assembly were heated gently with a heat gun to aid in the monomer removal. The total time under vacuum was 2 hours.

The molten prepolymer was dissolved in 84 ml of chloroform with stirring and 2.5 equivalents of TEA and 0.5 equivalents of DMAP were added to the stirring reaction mixture using a powder funnel. The reaction mixture was chilled to about −5° C. A solution of about 1 equivalent of distilled $EPCl_2$ in 9 ml of chloroform was prepared in a dropping funnel. The solution in the funnel was added slowly to the reaction mixture over a period of 0.5 hour. After the addition was complete, the viscosity of the solution had increased significantly and the reaction mixture was allowed to stir at low temperature for 1 hour at −5° C. The reaction was then quenched with 1 ml of anhydrous methanol and stirred for another five minutes.

Next, the reaction mixture was transferred to a 0.5 gallon vessel and mixed with 37 g of Dowex DR-2030 and 30 g of Dowex M-43, and shaken on a mechanical shaker for 2 hour to remove residual DMAP and TEA free base and salts (the Rs had been washed with several bed volumes of methanol and chloroform and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to approximately 50 ml. The viscous filtrate was poured into 200 ml of petroleum ether to precipitate the polymer. The polymer mass was washed with 100 ml of petroleum ether and dried under vacuum. The molecular weight data for the polymers prepared by this process are listed in the table below.

| Sample | Mw (LS), daltons | Mw (CC), daltons |
|---|---|---|
| 1 | 339,900 | 327,600 |
| 2 | 369,800 | 360,900 |

EXAMPLE 24

A was prepared from propylene glycol, D,L-lactide, and ethyl dichlorophosphonate ($EPCl_2$) as follows:

All glassware was dried for a minimum of 2 hours at 105° C. and allowed to cool in a desiccator or cooled under a stream of argon gas. A 190.0 g portion of D,L-lactide and 10.0 g of PG (molar ratio, 10:1) were weighed into a 2000 ml 3-neck round bottom flask. The flask was equipped with a gas joint and a stirrer bearing/shaft/paddle assembly. The mixture was evacuated and filled with argon five times to remove residual air and moisture. The reaction apparatus was immersed in a preheated oil bath at 130° C., connected to an argon source with an oil bubbler, and stirred at a moderate speed until all of the solid monomer had melted.

At this time, a volume of stock stannous octoate solution (about 130 mg/ml in toluene) equivalent to 200 ppm stannous octoate was added to the melt using a syringe. The reaction mixture was allowed to stir under a slight argon pressure for 4 hours. The oil bath temperature was then reduced to about 110° C. and the residual monomer was removed under vacuum. The upper parts of the reaction assembly were heated gently with a heat gun to aid in the monomer removal. The total time under vacuum was 2 hours.

The molten prepolymer was dissolved in 560 ml of chloroform with stirring and 2.5 equivalents of TEA, 0.5 equivalents of DMAP and 433 μl of anhydrous methanol (7.5 mole % based on PG) were added to the stirring reaction mixture. The reaction mixture was chilled to about −5° C. A solution of about 1 equivalent of distilled $EPCl_2$ in 60 ml of chloroform was prepared in a dropping funnel. The solution in the funnel was added slowly to the reaction mixture over a period of 0.5 hour. After the addition was complete, the viscosity of the solution had increased significantly and the reaction mixture was allowed to stir at low temperature for 1 hour at −5° C. The reaction was then quenched with 1 ml of anhydrous methanol and stirred for another five minutes.

Next, the reaction mixture was transferred to a 1 gallon vessel and mixed with 248 g of Dowex DR-2030 and 198 g of Dowex M-43, and shaken on a mechanical shaker for 2 hour to remove residual DMAP and TEA free base and salts (the IERs had been washed with several bed volumes of methanol and chloroform and dried under vacuum at ambient temperature for about 18 hours). The resin was removed from the reaction mixture by vacuum filtration through Whatman 54 filter paper. The resin was washed with about one bed volume of dichloromethane and the filtrate was concentrated to less than approximately 500 ml. The viscous filtrate was poured into 1500 ml of petroleum ether to precipitate the polymer. The polymer mass was washed with 200 ml of petroleum ether and dried under vacuum. The molecular weights were determined by GPC were 31,300 for Mw (LS) and 41,800 for Mw (CC).

EXAMPLE 25

A was prepared from 1,4-cyclohexane dimethanol (CHDM) and hexyl dichlorophosphate (HOPCl$_2$) as follows:

All glassware was dried for a minimum of two hours at 105° C. and allowed to cool in a desiccator or cooled under a stream of argon gas. A reaction assembly consisting of a 1 L three neck round bottom flask equipped with a gas joint, a stirrer bearing/shaft/paddle and a dropping funnel. A solution of 20.0 g of CHDM was prepared in 75 ml of anhydrous tetrahydrofuran (THF) and transferred to the reaction vessel. The beaker was rinsed with 25 ml of THF and the wash was transferred to the reaction vessel.

Next, 29.0 ml of N-methyhnorpholine (NMM) and 1.61 g of DMAP were added to the reaction mixture through a powder funnel. A solution of 28.86 g of HOPCl$_2$ in 30 ml of THF was prepared under argon and transferred to the dropping funnel while the reaction mixture was cooled to 4° C. in a cold bath. The solution in the funnel was added to the reaction mixture over a period of one hour. With 5 to 10 minutes after the start of addition, a white precipitate, presumably the hydrochloride salts of NMM and DMAP, began to form. After the addition was complete the funnel was rinsed with 30 ml of THF. The reaction mixture was stirred for 1 hour at 4° C. and then for either 2 or 18 hours at ambient temperature.

At the prescribed time, the precipitate was removed from reaction mixture by vacuum filtration. The filtrate was diluted with 100 ml of dichloromethane, transferred to a half gallon jar and 86.5 of dried Dowex HCR-S and 103.8 g of dried Dowex M-43 were added to the filtrate. The jar was sealed with a Teflon lined lid and the mixture was agitated on a mechanical shaker for two hours.

At this time, the IERs were removed by vacuum filtration and the filtrate was concentrated to approximately 100 ml under vacuum. The polymer solution was poured in 2 L of hexane and the resulting fluid material that precipitated was isolated and transferred to a Teflon lined glass dish. The polymer was dried under vacuum to yield a sticky, free flowing viscous liquid. The Mw (LS) data for the polymers prepared by this process are listed in the table below.

| Sample | Mw (LS), daltons | Mw (CC), daltons | IV, dL/g |
|---|---|---|---|
| 1 | 4400 | 5500 | 0.14 |
| 2 | 5000 | 6500 | 0.11 |
| 3 | 4000 | 4600 | 0.10 |

Example 26

A phosphopolymer (BHET/EOP) was prepared from bis (hydroxyethyl) terephthalate (BHET) and EOPCl$_2$ as follows:

All glassware was dried for a minimum of two hours at 105° C. and allowed to cool in a desiccator or cooled under a stream of argon gas. A reaction assembly consisting of a 500 ml three neck round bottom flask equipped with a gas joint, a stirrer bearing/shaft/paddle and a dropping funnel. First, 30.0 g of BHET and 28.83 g of DMAP were added to the reaction vessel using a powder funnel and mixed with 81 ml of THF. The solids were dissolved with stirring and gentle heating using a heat gun.

After all solids had dissolved, the reaction mixture was cooled to 4° C. in a cold bath. A solution of 19.2 g of EOPCl$_2$ in 24 ml of THF was prepared in a 125 ml addition funnel. The solution in the funnel was added to the solution in the flask over a period of 1 hour. Shortly after the addition had begun, a white precipitate, presumably DMAP hydrochloride, began to precipitate from the reaction mixture. After all of the solution in the funnel had been added, the stirrer shaft/paddle became entrapped in a thick, stiff precipitate and stirring ceased. It appears the polymer that had formed at this time was insoluble in the reaction mixture.

Next, 125 ml of dichloromethane were added and the reaction mixture was swirled by hand until mechanical stirring could be resumed. The reaction mixture was now a homogenous solution containing a white free flowing powder. The reaction mixture was stirred at 4° C. for one hour. The cold bath was removed and the reaction mixture was allowed to warm to ambient temperature and stirred for 16 hours. At this time, the white precipitate was removed from the reaction mixture by vacuum filtration and the filter cake was washed with 100 ml of dichloromethane.

The resulting filtrate was transferred to half gallon jar and treated with 156.92 g of undried Dowex HCR-S and 160.92 g of undried Dowex M-43. The resins were washed with 2 bed volumes of methanol and 2 bed volumes of dichloromethane prior to use. The jar was sealed with a Teflon lined lid and shaken on a mechanical shaker for two hours. The resin was removed by vacuum filtration and the filtrate, about 600 ml, was concentrated to about 150 ml. The clear solution was poured into 1.2 L of hexane. The thick oil that precipitated was washed with 400 ml of hexane and transferred to a Teflon lined glass dish, dried under vacuum. The molecular weights were determined by GPC were 2200 for Mw (LS) and 2100 for Mw (CC). The value obtained for IV was 0.10 dL/g.

EXAMPLE 27

A phosphopolymer (BHET/EOP/TC) was prepared from BHET, EOPCl$_2$, and terephthaloyl chloride (TC) as follows:

All glassware was dried for a minimum of two hours at 105° C. and allowed to cool in a desiccator or cooled under a stream of argon gas. A reaction assembly consisting of a 500 ml three neck round bottom flask equipped with a gas joint, a stirrer bearing/shaft/paddle and a dropping funnel. First, 30.0 g of BHET and 28.83 g of DMAP were added to the reaction vessel using a powder funnel and mixed with 81 ml of THF and 125 ml of dichloromethane.

The solids were dissolved with stirring and gentle heating using a heat gun. After all solids had dissolved, the reaction mixture was cooled to 4° C. in a cold bath. A solution of 19.2 g of $EOPCl_2$ in 24 ml of THF was prepared in a 125 ml addition funnel. The solution in the funnel was added to the solution in the flask over a period of 1 hour. Shortly after the addition had begun, a white precipitate, presumably DMAP hydrochloride, began to precipitate from the reaction mixture. The reaction mixture was stirred at 4° C. for one hour. Next, a solution of 4.79 g of TC in 18 ml of THF was prepared in the addition funnel and added to the solution in the flask over a 30 minute period. The reaction mixture was stirred for one hour at 4° C.

At this time the cold bath was removed and the reaction was allowed to warm to room temperature and stir for another 20 hours. At this time, the white precipitate was removed from the reaction mixture by vacuum filtration. The resulting filtrate was transferred to half gallon jar and treated with 88.5 g of dried Dowex HCR-S and 73.8 g of dried Dowex M-43. The jar was sealed with a Teflon lined lid and shaken on a mechanical shaker for two hours. The resin was removed by vacuum filtration and the filtrate was concentrated to 100 ml. The clear solution was poured into 2 L of hexane. The thick oil that precipitated was transferred to a Teflon lined glass dish, dried under vacuum. The molecular weights were determined by GPC were 7200 for Mw (LS) and 4000 for Mw (CC). The value obtained for IV was 0.09 dL/g.

It is to be understood that the description, specific examples and data, while indicating exemplary embodiments, are given by way of illustration and are not intended to limit the present invention. Various changes and modifications within the present invention will become apparent to the skilled artisan from the discussion, disclosure and data contained herein, and thus are considered part of the invention.

What is claimed is:

1. A method of producing a polyphosphoester, comprising:
    reacting a prepolymer with an organophosphorous compound in the presence of at least one acid scavenger until substantially all of the organophosphorous compound has bound with the prepolymer to form a polyphosphoester; and
    purifyng the polyphosphoester.
2. The method according to claim 1, wherein the reaction is quenched with an alcohol prior to the purification.
3. The method according to claim 1, wherein the reaction is performed at a warm temperature.
4. The method according to claim 1, wherein the reaction is performed at a cold temperature.
5. The method according to claim 1, wherein the purification employs at least one ion exchange resin.
6. The method according to claim 1, wherein the prepolymer is formed from one or more selected from the group consisting of D,L-lactide, trimethylene chloride, L-lactide, caproloactone, dioxanone, propylene glycol, ethylene glycol, 1,6 hexanediol, glycolide, 1,4-cyclohexane dimethanol, terephthaloyl chloride and bis(hydroxyethyl) terephthalate.
7. The method according to claim 1, wherein the organophosphorous compound is selected from the group consisting of alkyl dichlorophosphates, alkyl dichlorophosphonates, alkyl dichlorophosphites, aryl dichlorophosphates, aryl dichlorophosphonates, aryl dichlorophosphites, alkylaryl dichlorophosphates, alkylaryl dichlorophosphonates, and alkylaryl dichlorophosphites.
8. The method according to claim 7, wherein the organophosphorous compound is selected from the group consisting of ethyl dichlorophosphate, ethyl dichlorophosphonate, hexyl dichlorophosphate, and hexyl dichlorophosphonate.
9. The method according to claim 1, wherein the polyphosphoester is biodegradable.
10. A polyphosphoester obtainable by:
    reacting a prepolymer with an organophosphorous compound in the presence of at least one acid scavenger until substantially all of the organophosphorous compound has bound with the prepolymer to form a polyphosphoester; and
    purifying the polyphosphoester.
11. The polyphosphoester according to claim 10, wherein the reaction is quenched with an alcohol prior to the purification.
12. The polyphosphoester according to claim 10, wherein the reaction is performed at a warm temperature.
13. The polyphosphoester according to claim 10, wherein the reaction is performed at a cold temperature.
14. The polyphosphoester according to claim 10, wherein the purification employs at least one ion exchange resin.
15. The polyphosphoester according to claim 10, wherein the prepolymer is formed from one or more selected from the group consisting of D,L-lactide, trimethylene chloride, L-lactide, caproloactone, dioxanone, propylene glycol, ethylene glycol, 1,6 hexanediol, glycolide, 1,4-cyclohexane dimethanol, terephthaloyl chloride and bis(hydroxyethyl) terephthalate.
16. The polyphosphoester according to claim 10, wherein the organophosphorous compound is selected from the group consisting of alkyl dichlorophosphates, alkyl dichlorophosphonates, alkyl dichlorophosphites, aryl dichlorophosphates, aryl dichlorophosphonates, aryl dichlorophosphites, alkylaryl dichlorophosphates, alkylaryl dichlorophosphonates, and alkylaryl dichlorophosphites.
17. The polyphosphoester according to claim 10, wherein the organophosphorous compound is selected from the group consisting of ethyl dichlorophosphate, ethyl dichlorophosphonate, hexyl dichlorophosphate and hexyl dichlorophosphonate.
18. The polyphosphoester according to claim 10, wherein the polyphosphoester is biodegradable.
19. A method of producing a polyphosphoester, comprising:
    reacting a prepolymer with an organophosphorous compound in the presence of at least one acid scavenger at a cold temperature until substantially all of the organophosphorous compound has bound with the prepolymer to form a polyphosphoester;
    stopping the reaction;
    contacting the polyphosphoester with at least one ion exchange resin; and
    removing the ion exchange resin to yield a purified polyphosphoester.
20. The method according to claim 19, wherein the reaction is stopped by quenching with an alcohol.
21. The method according to claim 19, wherein the polyphosphoester is contacted with an acidic ion exchange resin and a basic ion exchange resin.

22. The method according to claim 19, further comprising concentrating the polyphosphoester;
    precipitating the polyphosphoester; and
    drying the polyphosphoester.

23. The method according to claim 19, wherein the prepolymer is formed from one or more selected from the group consisting of D,L-lactide, trimethylene chloride, L-lactide, caproloactone, dioxanone, propylene glycol, ethylene glycol, 1,6 hexanediol, glycolide, 1,4-cyclohexane dimethanol, terephthaloyl chloride and bis(hydroxyethyl) terephthalate.

24. The method according to claim 19, wherein the organophosphorous compound is selected from the group consisting of alkyl dichlorophosphates, alkyl dichlorophosphonates, alkyl dichlorophosphites, aryl dichlorophosphates, aryl dichlorophosphonates, aryl dichlorophosphites, alkylaryl dichlorophosphates, alkylaryl dichlorophosphonates, and alkylaryl dichlorophosphites.

25. The method according to claim 24, wherein the organophosphorous compound is selected from the group consisting of ethyl dichlorophosphate, ethyl dichlorophosphonate, hexyl dichlorophosphate and hexyl dichlorophosphonate.

26. The method according to claim 19, wherein the at least 50% of the contaminants are removed by the ion exchange resin.

27. The method according to claim 19, wherein the at least 70% of the contaminants are removed by the ion exchange resin.

28. The method according to claim 19, wherein the at least 90% of the contaminants are removed by the ion exchange resin.

29. The method according to claim 19, wherein the purified polyphosphoester has a metal content of less than 20 ppm.

30. The method according to claim 19, wherein the purified polyphosphoester has a metal content of less than 10 ppm.

31. The method according to claim 19, wherein the purified polyphosphoester has a metal content of less than 5 ppm.

32. The method according to claim 19, wherein the polyphosphoester is biodegradable.

33. A polyphosphoester obtainable by:
    reacting a prepolymer with an organophosphorous compound in the presence of at least one acid scavenger at a cold temperature until substantially all of the organophosphorous compound has bound with the prepolymer to form a polyphosphoester;
    stopping the reaction;
    contacting the polyphosphoester with at least one ion exchange resin; and
    removing the ion exchange resin.

34. The polyphosphoester according to claim 33, wherein the polyphosphoester is contacted with an acidic ion exchange resin and a basic ion exchange resin.

35. The polyphosphoester according to claim 33, further comprising
    concentrating the polyphosphoester;
    precipitating the polyphosphoester; and
    drying the polyphosphoester.

36. The polyphosphoester according to claim 33, wherein the prepolymer is formed from one or more selected from the group consisting of D,L-lactide, trimethylene chloride, L-lactide, caproloactone, dioxanone, propylene glycol, ethylene glycol, 1,6 hexanediol, glycolide, 1,4-cyclohexane dimethanol, terephthaloyl chloride and bis(hydroxyethyl) terephthalate.

37. The polyphosphoester according to claim 33, wherein the organophosphorous compound is selected from the group consisting of alkyl dichlorophosphates, alkyl dichlorophosphonates, alkyl dichlorophosphites, aryl dichlorophosphates, aryl dichlorophosphonates, aryl dichlorophosphites, alkylaryl dichlorophosphates, alkylaryl dichlorophosphonates, and alkylaryl dichlorophosphites.

38. The polyphosphoester according to claim 33, wherein the organophosphorous compound is selected from the group consisting of ethyl dichlorophosphate, ethyl dichlorophosphonate, hexyl dichlorophosphate and hexyl dichlorophosphonate.

39. The polyphosphoester according to claim 33, wherein the polyphosphoester has a metal content of less than 20 ppm.

40. The polyphosphoester according to claim 33, wherein the polyphosphoester has a metal content of less than 10 ppm.

41. The polyphosphoester according to claim 33, wherein the polyphosphoester has a metal content of less than 5 ppm.

42. The polyphosphoester according to claim 33, wherein the polyphosphoester is biodegradable.

43. A method of producing a polyphosphoester, comprising:
    reacting a prepolymer with an organophosphorous compound in the presence of one or more acid scavengers until substantially all of the organophosphorous compound has bound with the prepolymer to form a polyphosphoester, wherein at least one acid scavenger is a substituted aminopyrideine; and
    purifying the polyphosphoester.

44. The method according to claim 43, wherein the reaction is performed at a warm temperature.

45. The method according to claim 43, wherein the reaction is performed at a cold temperature.

46. The method according to claim 43, wherein the purification employs at least one ion exchange resin.

47. A polyphosphoester obtainable by:
    reacting a prepolymer with an organophosphorous compound in the presence of one or more acid scavengers until substantially all of the organophosphorous compound has bound with the prepolymer to form a polyphosphoester, wherein at least one of the acid scavengers is a substituted aminopyridine; and
    purifying the polyphosphoester.

48. The polyphosphoester according to claim 47, wherein the reaction is performed at a warm temperature.

49. The polyphosphoester according to claim 47, wherein the reaction is performed at a cold temperature.

50. The polyphosphoester according to claim 47, wherein the purification employs at least one ion exchange resin.

51. A method of purifying a polymer preparation, comprising contacting the polymer preparation with at least one ion exchange resin.

52. The method according to claim 51, wherein the polymer preparation is contacted with an acidic resin and a basic resin.

53. The method according to claim 51, wherein the acidic resin is a strong acidic resin, and the basic resin is a weak basic resin.

54. The method according to claim 51, wherein the ion exchange resin removes metal contaminants from the polymer preparation.

55. The method according to claim 54, wherein the metal contaminants are selected from the group consisting of tin and zinc.

56. The method according to claim 55, wherein the polymer has a metal content of less than 20 ppm.

57. The method according to claim 55, wherein the polymer has a metal content of less than 10 ppm.

58. The method according to claim 55, wherein the polymer has a metal content of less than 5 ppm.

59. A polymer preparation having a reduced level of metal contaminants, wherein the polymer preparation is obtainable by contacting the polymer preparation with at least one ion exchange resin.

60. The polymer preparation according to claim 59, wherein the polymer preparation is contacted with an acidic resin and a basic resin.

61. The polymer preparation according to claim 60, wherein the acidic resin is a strong acidic resin, and the basic resin is a weak basic resin.

62. The polymer preparation according to claim 59, wherein the metal contaminants are selected from the group consisting of tin and zinc.

63. The polymer according to claim 59, wherein the polymer has a metal content of less than 20 ppm.

64. The method according to claim 59, wherein the polymer has a metal content of less than 10 ppm.

65. The method according to claim 59, wherein the polymer has a metal content of less than 5 ppm.

66. A method of producing a polyphosphoester, comprising:

reacting a prepolymer with an organophosphorous compound in the presence of at least one acid scavenger at a cold temperature until substantially all of the organophosphorous compound has bound with the prepolymer to form a polyphosphoester;

stopping the reaction;

contacting the polyphosphoester with an acidic ion exchange resin and a basic ion exchange resin; and removing the acidic and basic ion exchange resins to yield a purified polyphosphester that has a reduced level of metal contaminants.

67. The method according to claim 66, wherein the metal contaminants are selected from the group consisting of tin and zinc.

68. A method of producing a polyphosphoester comprising reacting a diol with an organophosphorus compound in the presence of at least one acid scavenger until substantially all of the organophosphorus compound has bound with the diol to form a polyphosphoester, and purifying the polyphosphoester.

69. The method according to claim 51, wherein the polymer is a polyphosphoester.

70. The method according to claim 69, wherein the polyphosphoester is obtainable by reacting a prepolymer with an organophosphorous compound in the presence of at least one acid scavenger until substantially all of the organophosphorous compound has bound with the prepolymer to form the polyphosphoester.

71. The method according to claim 70, wherein at least one acid scavenger is a substituted aminopyridine.

72. The polymer preparation according to claim 59, wherein the polymer is a polyphosphoester.

73. The polymer preparation according to claim 69, wherein the polyphosphoester is obtainable by reacting a prepolymer with an organophosphorous compound in the presence of at least one acid scavenger until substantially all of the organophosphorous compound has bound with the prepolymer to form the polyphosphoester.

74. The polymer preparation according to claim 73, wherein at least acid scavenger is a substituted aminopyridine.

* * * * *